US012003956B2

(12) United States Patent
Naujok et al.

(10) Patent No.: US 12,003,956 B2
(45) Date of Patent: Jun. 4, 2024

(54) IDENTITY VERIFICATION PLATFORM

(71) Applicant: Prove Identity, Inc., New York, NY (US)

(72) Inventors: Jeffrey Naujok, Colorado Springs, CO (US); Christopher Cunningham, Highlands Ranch, CO (US); Greg Bonin, Denver, CO (US)

(73) Assignee: Prove Identity, Inc., New York, NY (US)

( * ) Notice: Subject to any disclaimer, the term of this patent is extended or adjusted under 35 U.S.C. 154(b) by 0 days.

(21) Appl. No.: 17/728,627

(22) Filed: Apr. 25, 2022

(65) Prior Publication Data

US 2022/0248217 A1    Aug. 4, 2022

Related U.S. Application Data

(63) Continuation of application No. 17/127,976, filed on Dec. 18, 2020, now abandoned.

(60) Provisional application No. 62/956,020, filed on Dec. 31, 2019.

(51) Int. Cl.
| H04M 1/66 | (2006.01) |
| H04L 67/01 | (2022.01) |
| H04W 12/02 | (2009.01) |
| H04W 12/68 | (2021.01) |
| H04W 12/72 | (2021.01) |

(52) U.S. Cl.
CPC .............. *H04W 12/02* (2013.01); *H04L 67/01* (2022.05); *H04W 12/68* (2021.01); *H04W 12/72* (2021.01)

(58) Field of Classification Search
CPC .... H04L 63/08; H04W 12/06; H04W 12/062; H04W 12/065; H04W 12/068; H04W 12/08
See application file for complete search history.

(56) References Cited

U.S. PATENT DOCUMENTS

| 5,727,163 | A | 3/1998 | Bezos |
| 5,874,918 | A | 2/1999 | Czamecki |
| 5,930,474 | A | 7/1999 | Dunworth |
| 6,012,144 | A | 1/2000 | Pickett |
| 6,151,631 | A | 11/2000 | Ansell |
| 6,249,252 | B1 | 6/2001 | Dupray |

(Continued)

FOREIGN PATENT DOCUMENTS

| AU | 2011209699 | 9/2014 |
| CA | 2787921 | 3/2020 |

(Continued)

OTHER PUBLICATIONS

U.S. Appl. No. 17/561,616: Notice of Publication dated Jun. 23, 2022, 1 pages, Doc 1845.

(Continued)

*Primary Examiner* — Shantell L Heiber
(74) *Attorney, Agent, or Firm* — Husch Blackwell LLP; Bryan D. Stewart

(57) ABSTRACT

Briefly, example methods, apparatuses, and/or articles of manufacture are disclosed that may be implemented, in whole or in part, using one or more computing devices to facilitate and/or support one or more operations and/or techniques for an identity verification platform, such as implemented, at least in part, via one or more electronic communication networks.

20 Claims, 7 Drawing Sheets

(56) References Cited

U.S. PATENT DOCUMENTS

| | | |
|---|---|---|
| 6,684,250 B2 | 1/2004 | Anderson |
| 6,748,367 B1 | 6/2004 | Lee |
| 6,891,953 B1 | 5/2005 | Demello |
| 6,947,978 B2 | 9/2005 | Huffman |
| 7,100,204 B1 | 8/2006 | Myllymaki |
| 7,103,261 B2 | 9/2006 | Grecia |
| 7,194,354 B1 | 3/2007 | Oran |
| 7,254,235 B2 | 8/2007 | Boudreault |
| 7,343,014 B2 | 3/2008 | Sovio |
| 7,526,650 B1 | 4/2009 | Wimmer |
| 7,769,998 B2 | 8/2010 | Lynch |
| 8,001,612 B1 | 8/2011 | Wieder |
| 8,136,148 B1 | 3/2012 | Chayanam |
| 8,341,236 B1 | 12/2012 | Ganesan |
| 8,402,555 B2 | 3/2013 | Grecia |
| 8,438,382 B2 | 5/2013 | Ferg |
| 8,490,168 B1 | 7/2013 | Holloway |
| 8,494,576 B1 | 7/2013 | Bye |
| 8,533,860 B1 | 9/2013 | Grecia |
| 8,549,601 B2 | 10/2013 | Ganesan |
| 8,589,459 B1 | 11/2013 | Ganesan |
| 8,769,784 B2 | 7/2014 | Ganesan |
| 8,789,153 B2 | 7/2014 | Ganesan |
| 8,806,592 B2 | 8/2014 | Ganesan |
| 8,887,308 B2 | 11/2014 | Grecia |
| 9,325,702 B2 | 4/2016 | Ganesan |
| D769,296 S | 10/2016 | Grecia |
| 9,465,921 B1 | 10/2016 | Ramzan |
| 9,614,838 B1 | 4/2017 | Duchin et al. |
| 9,614,845 B2 | 4/2017 | Rolfe |
| 9,667,613 B1 | 5/2017 | Wisemon et al. |
| 9,787,672 B1 | 10/2017 | Dundas |
| D826,955 S | 8/2018 | Grecia |
| 10,084,782 B2 | 9/2018 | Rolfe |
| 10,250,602 B2 | 4/2019 | Rolfe |
| 10,284,549 B2 | 5/2019 | Ganesan |
| D857,054 S | 8/2019 | Grecia |
| D857,712 S | 8/2019 | Grecia |
| 10,397,780 B2 | 8/2019 | Rolfe |
| 10,616,222 B2 | 4/2020 | Rolfe |
| 10,694,029 B1 | 6/2020 | Jakobsson |
| 10,762,558 B1 | 9/2020 | Drobnik |
| 10,785,215 B2 | 9/2020 | Ganesan |
| 11,218,480 B2 | 1/2022 | Rolfe |
| 11,223,948 B2 | 1/2022 | Rolfe |
| 2002/0049644 A1 | 4/2002 | Kargman |
| 2002/0095507 A1 | 7/2002 | Jerdonek |
| 2003/0028451 A1 | 2/2003 | Ananian |
| 2003/0165328 A1 | 9/2003 | Grecia |
| 2004/0030934 A1 | 2/2004 | Mizoguchi |
| 2004/0210536 A1 | 10/2004 | Gudelj |
| 2004/0225878 A1 | 11/2004 | Costa-Requena |
| 2004/0242238 A1 | 12/2004 | Wang |
| 2005/0065891 A1 | 3/2005 | Lee |
| 2005/0071417 A1 | 3/2005 | Taylor |
| 2005/0135242 A1 | 5/2005 | Larsen |
| 2005/0144452 A1 | 6/2005 | Lynch |
| 2005/0172229 A1 | 8/2005 | Reno |
| 2005/0203959 A1 | 9/2005 | Muller |
| 2005/0254653 A1 | 11/2005 | Potashnik |
| 2006/0031528 A1* | 2/2006 | Raguseo ............ H04L 67/2871 709/227 |
| 2006/0168259 A1 | 7/2006 | Spilotro |
| 2006/0168663 A1 | 7/2006 | Viljoen |
| 2006/0206709 A1 | 9/2006 | Labrou |
| 2006/0212401 A1 | 9/2006 | Ameerally |
| 2006/0229996 A1 | 10/2006 | Keithley |
| 2006/0235795 A1 | 10/2006 | Johnson |
| 2007/0011724 A1 | 1/2007 | Gonzalez |
| 2007/0067828 A1 | 3/2007 | Bychkov |
| 2007/0074276 A1 | 3/2007 | Harrison |
| 2007/0077916 A1 | 4/2007 | Saito |
| 2007/0079135 A1 | 4/2007 | Saito |
| 2007/0094150 A1 | 4/2007 | Yuen |
| 2007/0167171 A1 | 6/2007 | Bishop |
| 2007/0156726 A1 | 7/2007 | Levy |
| 2007/0157304 A1 | 7/2007 | Logan |
| 2007/0169174 A1 | 7/2007 | Critten |
| 2007/0174904 A1 | 7/2007 | Park |
| 2007/0186095 A1 | 8/2007 | Ganesan |
| 2007/0198437 A1 | 8/2007 | Eisner |
| 2007/0250920 A1 | 10/2007 | Lindsay |
| 2007/0279227 A1 | 12/2007 | Juels |
| 2007/0283273 A1 | 12/2007 | Woods |
| 2008/0010685 A1 | 1/2008 | Holtzman |
| 2008/0028447 A1 | 1/2008 | O'Malley |
| 2008/0034216 A1 | 2/2008 | Law |
| 2008/0037536 A1 | 2/2008 | Padmanabhan |
| 2008/0052180 A1 | 2/2008 | Lawhorn |
| 2008/0065884 A1 | 3/2008 | Emeott |
| 2008/0072048 A1 | 3/2008 | Brown |
| 2008/0091606 A1 | 4/2008 | Grecia |
| 2008/0109657 A1 | 5/2008 | Bejaj |
| 2008/0120707 A1 | 5/2008 | Ramia |
| 2008/0137554 A1 | 6/2008 | Nandhra |
| 2008/0172730 A1 | 7/2008 | Sandhu |
| 2008/0222199 A1 | 9/2008 | Tiu |
| 2008/0254765 A1 | 10/2008 | Eliaz |
| 2008/0313264 A1 | 12/2008 | Pestoni |
| 2008/0313714 A1 | 12/2008 | Fetterman |
| 2008/0313719 A1 | 12/2008 | Kaliski |
| 2009/0018909 A1 | 1/2009 | Grecia |
| 2009/0037983 A1 | 2/2009 | Chiruvolu |
| 2009/0083430 A1 | 3/2009 | Edge |
| 2009/0083541 A1 | 3/2009 | Levine |
| 2009/0093300 A1 | 4/2009 | Lutnick |
| 2009/0106138 A1 | 4/2009 | Smith |
| 2009/0119207 A1 | 5/2009 | Grecia |
| 2009/0119754 A1 | 5/2009 | Schubert |
| 2009/0119776 A1 | 5/2009 | Palntkar |
| 2009/0132813 A1 | 5/2009 | Schibuk |
| 2009/0232515 A1 | 9/2009 | Marien |
| 2009/0235339 A1 | 9/2009 | Mennes |
| 2009/0249076 A1 | 10/2009 | Reed |
| 2009/0249077 A1 | 10/2009 | Gargaro |
| 2009/0254572 A1 | 10/2009 | Redlich |
| 2009/0259588 A1 | 10/2009 | Lindsay |
| 2009/0259848 A1 | 10/2009 | Williams |
| 2009/0265768 A1 | 10/2009 | Labaton |
| 2009/0265775 A1 | 10/2009 | Wisely |
| 2009/0265776 A1 | 10/2009 | Baentsch |
| 2009/0288159 A1 | 11/2009 | Husemann |
| 2009/0307767 A1 | 12/2009 | Semba |
| 2009/0328168 A1 | 12/2009 | Lee |
| 2010/0010906 A1 | 1/2010 | Grecia |
| 2010/0017860 A1 | 1/2010 | Ishida |
| 2010/0024022 A1 | 1/2010 | Wells |
| 2010/0041391 A1 | 2/2010 | Spivey |
| 2010/0100899 A1 | 4/2010 | Bradbury |
| 2010/0131670 A1 | 5/2010 | Ishii |
| 2010/0153540 A1 | 6/2010 | Li |
| 2010/0180328 A1 | 7/2010 | Moas |
| 2010/0185868 A1 | 7/2010 | Grecia |
| 2010/0235897 A1 | 9/2010 | Mason |
| 2010/0242104 A1 | 9/2010 | Wankmueller |
| 2010/0262834 A1 | 10/2010 | Freeman |
| 2010/0268831 A1 | 10/2010 | Scott |
| 2010/0275248 A1 | 10/2010 | Li |
| 2010/0278322 A1 | 11/2010 | Krantz et al. |
| 2011/0047372 A1 | 2/2011 | Ganesan |
| 2011/0072499 A1 | 3/2011 | Lin |
| 2011/0099382 A1 | 4/2011 | Grecia |
| 2011/0149926 A1 | 6/2011 | Li |
| 2011/0153496 A1 | 6/2011 | Royyuru |
| 2011/0159848 A1 | 6/2011 | Pei |
| 2011/0161989 A1 | 6/2011 | Russo |
| 2011/0162036 A1 | 6/2011 | Heo |
| 2011/0185405 A1 | 7/2011 | Ganesan |
| 2011/0185413 A1 | 7/2011 | Fujii |
| 2011/0208801 A1 | 8/2011 | Thorkelsson |
| 2011/0265149 A1 | 10/2011 | Ganesan |
| 2011/0273551 A1 | 11/2011 | Yang |
| 2011/0288946 A1 | 11/2011 | Baiya |
| 2012/0005483 A1 | 1/2012 | Patvarczki |

(56) References Cited

U.S. PATENT DOCUMENTS

| | | |
|---|---|---|
| 2012/0066120 A1 | 3/2012 | Ringewald et al. |
| 2012/0084850 A1 | 4/2012 | Novak |
| 2012/0124651 A1 | 5/2012 | Ganesan |
| 2012/0129492 A1 | 5/2012 | Mechaley |
| 2012/0144202 A1 | 6/2012 | Counterman |
| 2012/0150687 A1 | 6/2012 | Hart |
| 2012/0151220 A1 | 6/2012 | Grecia |
| 2012/0192255 A1 | 7/2012 | Ganesan |
| 2012/0202517 A1 | 8/2012 | Edge |
| 2012/0209705 A1 | 8/2012 | Ramer |
| 2012/0272056 A1 | 10/2012 | Ganesan |
| 2012/0311660 A1 | 12/2012 | Park |
| 2013/0091544 A1 | 4/2013 | Oberheide |
| 2013/0104187 A1 | 4/2013 | Weidner |
| 2013/0133086 A1 | 5/2013 | Liberman |
| 2013/0165040 A1 | 6/2013 | McIntyre |
| 2013/0227651 A1 | 8/2013 | Schultz |
| 2013/0232547 A1 | 9/2013 | Ganesan |
| 2013/0246281 A1 | 9/2013 | Yamada |
| 2013/0333006 A1 | 12/2013 | Tapling |
| 2014/0020073 A1 | 1/2014 | Ronda |
| 2014/0058951 A1 | 2/2014 | Kuppuswamy |
| 2014/0066015 A1 | 3/2014 | Aissi |
| 2014/0214670 A1 | 7/2014 | McKenna |
| 2014/0298432 A1 | 10/2014 | Brown |
| 2014/0304778 A1 | 10/2014 | Grecia |
| 2015/0020195 A1 | 1/2015 | Alizadeh-Shabdiz et al. |
| 2015/0113592 A1 | 4/2015 | Curtis et al. |
| 2015/0156267 A1 | 6/2015 | Zhang |
| 2015/0161378 A1 | 6/2015 | Oberheide |
| 2015/0254672 A1 | 9/2015 | Huesch |
| 2015/0287026 A1 | 10/2015 | Yang |
| 2015/0294313 A1 | 10/2015 | Kamal |
| 2015/0302397 A1 | 10/2015 | Kalgi |
| 2015/0310444 A1 | 10/2015 | Chen et al. |
| 2016/0036777 A1 | 2/2016 | Bartlett |
| 2016/0080381 A1 | 3/2016 | Hall |
| 2016/0127134 A1 | 5/2016 | Goldstone et al. |
| 2016/0132673 A1 | 5/2016 | Birk |
| 2016/0148597 A1 | 5/2016 | Hamid |
| 2016/0156620 A1 | 6/2016 | Ganesan |
| 2016/0162893 A1 | 6/2016 | Kamal |
| 2016/0191494 A1 | 6/2016 | Claes |
| 2016/0255477 A1 | 9/2016 | Parulski |
| 2016/0283745 A1 | 9/2016 | Lafever |
| 2016/0308862 A1 | 10/2016 | Rolfe |
| 2017/0034164 A1 | 2/2017 | Khalil |
| 2017/0085568 A1 | 3/2017 | Rolfe |
| 2017/0085635 A1 | 3/2017 | Nicholls |
| 2017/0109751 A1 | 4/2017 | Dunkelberger |
| 2017/0150349 A1 | 5/2017 | Huh |
| 2017/0245146 A1 | 8/2017 | Rolfe |
| 2017/0289172 A1 | 10/2017 | Turakhia |
| 2018/0060546 A1* | 3/2018 | Yin .................. H04L 63/08 |
| 2018/0137295 A1* | 5/2018 | Sharma ............. G06F 21/606 |
| 2018/0219846 A1 | 8/2018 | Poschel |
| 2018/0367537 A1 | 12/2018 | Rolfe |
| 2019/0074975 A1* | 3/2019 | Koskimies ......... H04W 12/126 |
| 2019/0220863 A1 | 7/2019 | Novick |
| 2019/0260746 A1 | 8/2019 | Rolfe |
| 2019/0349767 A1 | 11/2019 | Rolfe |
| 2020/0351267 A1 | 11/2020 | Rolfe |
| 2021/0204116 A1 | 7/2021 | Naujok |
| 2021/0266318 A1 | 8/2021 | Rolfe |
| 2022/0036044 A1* | 2/2022 | Leddy ................ G06F 21/32 |
| 2022/0051498 A1* | 2/2022 | Hart .................. G07C 9/00309 |
| 2022/0086152 A1 | 3/2022 | Rolfe |

FOREIGN PATENT DOCUMENTS

| | | |
|---|---|---|
| EP | 1936528 | 6/2007 |
| EP | 11737535 | 1/2011 |
| HK | 1171836 | 4/2013 |
| JP | 11338933 | 12/1999 |
| JP | 2001175599 | 6/2001 |
| JP | 2002259344 | 9/2002 |
| JP | 2003186838 | 7/2003 |
| JP | 2005209083 | 8/2005 |
| JP | 2006221440 | 8/2006 |
| JP | 2007102777 | 4/2007 |
| JP | 2007328381 | 12/2007 |
| JP | 2008123461 | 5/2008 |
| JP | 2013518348 | 5/2013 |
| SG | 182429 | 8/2012 |
| WO | WO2007026486 | 3/2007 |
| WO | WO2007103831 | 9/2007 |
| WO | WO2007107868 | 9/2007 |
| WO | 2010150019 A1 | 12/2010 |
| WO | 2013076731 A2 | 5/2013 |
| WO | WO2021138126 | 7/2021 |

OTHER PUBLICATIONS

Apple—"iOS Security" available at https://web. archive. org/web/20140226213513/http ://images. apple. com/iphone/business/docs/iOS Security_Feb14.pdf, Feb. 2014, 33 pages, Doc 1320.

Buecker—"Certification Study Guide: IBM Tivoli Access Manager for e-business 6.0," Feb. 2006, Version 6, Release 0, Modification 0 of IBM Tivoli Access Manager for e-business, (Product No. 5724 C87), 272 pages, Doc 1428A-1428B.

EBay Developers Program—"eBay Web Services XML API Guide," Version 407, Year 2005, 1117 pages, Doc 1551A-1551D.

Gralla—"How the Internet Works," 2006, Que, pp. 346-347, 1 page, Doc 1352.

Gueye—"Constraint-Based Geolocation of Internet Hosts", IEEE/ACM Transactions on Networking, vol. 14, No. 6, Dec. 2006, 14 pages, Doc 1210.

Hockings—"Two-factor Authentication Using Tivoli Access Manager WebSEAL," IBM Corporation, ibm.com/developerWorks/, 2005, 11 pages, Doc 1429.

IP2Location—"Identify Geographical Location and Proxy by IP Address", (http://www.ip2location.com), 2001, 6 pages, Doc 1208.

Katz-Bassett—"Towards IP Geolocation Using Delay and Topology Measurements" IMC'06, Oct. 25-27, 2006, Rio de Janeiro, Brazil, 13 pages, Doc 1211.

Nopass—"Login", available at https://web.archive.org/web/20141222170523/http://www.nopassapp.com/login/, Dec. 22, 2014, 1 page, Doc 1321.

Nopass—"No Password Login I Touch ID Fingerprint iPhone App," available at https://web.archive.org/web/20150328095715/http://www.nopassapp.com/, Mar. 28, 2015, 4 pages, Doc 1322.

Nopass—"Register", available at https://web.archive.org/web/20141222172212/http://www.nopassapp.com/register/, Dec. 22, 2014, 1 page, Doc 1323.

Padmanabhan—"An Investigation of Geographic Mapping Techniques for Internet Hosts", SIGCOMM'01, Aug. 27-31, 2001, San Diego, CA, 13 pages, Doc 1209.

Quova—"How we do it" (http://www.quova.com/what/how-we-do-it/), 2011, 3 pages, Doc 1250.

Rose—"Zero Trust Architecture," National Institute of Standards and Technology, Draft NIST Special Publication 800-207, Sep. 23, 2019, 59 pages, Doc 1324.

Warner—"iOS Security: How Apple Protects Data on iOS Devices—Part 1," Constant Contact Tech Blog, available at https://web.archive.org/web/20150403175348/https://techblog .constantcontact. com/softwaredevelopment/ios-security/, Dec. 8, 2014, 7 pages, Doc 1325.

wiki.gis.com—Geolocation Software (http://en.wikipedia.org/wiki/Geolocation_software), Last Updated May 23, 2011, 4 pages, Doc 1207.

WOT*Online—Against Intuition, Inc., 2006 (retrieved Aug. 24, 2012), URL:web.archive.org/web/20061127233933/http://www.mywot.com/en/wot/help/wot_symbols_explained/, pp. 1-3, 1 page, Doc 1353.

U.S. Appl. No. 17/127,976, filed Dec. 18, 2020, 142 pages, Doc 1326.

U.S. Appl. No. 17/127,976: Filing Receipt dated Feb. 10, 2021, pages, Doc 1327.

(56) References Cited

OTHER PUBLICATIONS

U.S. Appl. No. 17/127,976: Notice of Publication dated Jul. 1, 2021, 1 page, Doc 1328.
U.S. Appl. No. 17/127,976: Non-final Office Action dated Oct. 25, 2021, 8 pages, Doc 1329.
U.S. Appl. No. 17/127,976: Response to Non-final Office Action filed Jan. 21, 2022, 13 pages, Doc 1330.
U.S. Appl. No. 17/127,976: Final Office Action dated Apr. 8, 2022, 9 pages, Doc 1331.
PCT Application PCT/US2020/066475: PCT Application filed Dec. 21, 2020, 77 pages, Doc 1334.
PCT Application PCT/US2020/066475: International Search Report and Written Opinion dated Mar. 17, 2021, 10 pages, Doc 1335.
PCT Application PCT/US2020/066475: Notice of Publication dated Jul. 8, 2021, 1 page, Doc 1336.
PCT Application PCT/US2020/066475: Article 34 Amendment and Chapter II Demand filed Oct. 31, 2021, 27 pages, Doc 1338.
PCT Application PCT/US2020/066475: International Preliminary Report of Patentability Chapter II dated Nov. 24, 2021, 20 pages, Doc 1339.
U.S. Appl. No. 13/011,587, filed Jan. 21, 2011, 33 pages, Doc 1340.
U.S. Appl. No. 13/011,587: Filing Receipt and Notice to File Corrected Application Papers dated Feb. 7, 2011, 5 pages, Doc 1341.
U.S. Appl. No. 13/011,587: Response to Notice to File Corrected Application Papers filed Mar. 30, 2011, 5 pages, Doc 1345.
U.S. Appl. No. 13/011,587: Filing Receipt dated Apr. 13, 2011, 3 pages, Doc 1346.
U.S. Appl. No. 13/011,587: Notice of Publication dated Jul. 28, 2011, 1 page, Doc 1347.
U.S. Appl. No. 13/011,587: Non-final Office Action dated Dec. 17, 2012, 20 pages, Doc 1348.
U.S. Appl. No. 13/011,587: Amendment filed Jan. 22, 2013, 17 pages, Doc 1354.
U.S. Appl. No. 13/011,587: Final Office Action dated Apr. 29, 2013, 23 pages, Doc 1355.
U.S. Appl. No. 13/011,587: Response to Final Office Action filed May 20, 2013, 38 pages, Doc 1356.
U.S. Appl. No. 13/011,587: Advisory Action dated Jun. 17, 2013, 4 pages, Doc 1357.
U.S. Appl. No. 13/011,587: Examiner-initialed Interview Summary dated Jul. 15, 2013, 3 pages, Doc 1358.
U.S. Appl. No. 13/011,587: Non-final Office Action dated Nov. 5, 2013, 13 pages, Doc 1359.
U.S. Appl. No. 13/011,587: Updated Non-final Office Action dated Nov. 14, 2013, 27 pages, Doc 1360.
U.S. Appl. No. 13/011,587: Amendment filed Dec. 17, 2013, 69 pages, Doc 1361.
U.S. Appl. No. 13/011,587: Notice of Allowance dated Mar. 26, 2014, 17 pages, Doc 1370.
U.S. Appl. No. 13/011,587: Issue Fee Payment filed Jun. 16, 2014, 5 pages, Doc 1371.
U.S. Appl. No. 13/011,587: Issue Notification dated Jul. 2, 2014, 1 page, Doc 1372.
U.S. Appl. No. 13/011,739, filed Jan. 21, 2011, 35 pages, Doc 1373.
U.S. Appl. No. 13/011,739: Filing Receipt and Notice to File Corrected Application Papers dated Feb. 8, 2011, 6 pages. Doc 1374.
U.S. Appl. No. 13/011,739: Response to Notice to File Corrected Application Papers with new Figures filed Mar. 30, 2011, 11 pages. Doc 1375.
U.S. Appl. No. 13/011,739: Updated Filing Receipt dated Apr. 18, 2011, 11 pages, Doc 1376.
U.S. Appl. No. 13/011,739: Notice of Publication dated Jul. 26, 2012, 1 page, Doc 1377.
U.S. Appl. No. 13/011,739: Non-final Office Action dated Nov. 29, 2012, 12 pages, Doc 1378.
U.S. Appl. No. 13/011,739: Amendment filed Jan. 22, 2013, 13 pages, Doc 1379.
U.S. Appl. No. 13/011,739: Final Office Action dated Apr. 11, 2013, 17 pages, Doc 1380.
U.S. Appl. No. 13/011,739: Response to Final Office Action filed May 20, 2013, 29 pages, Doc 1381.
U.S. Appl. No. 13/011,739: Advisory Action dated Jun. 13, 2013, pages, Doc 1382.
U.S. Appl. No. 13/011,739: Examiner Initialed Interview Summary dated Jul. 17, 2013, 2 pages, Doc 1383.
U.S. Appl. No. 13/011,739: Non-final Office Action dated Oct. 16, 2013, 22 pages, Doc 1384.
U.S. Appl. No. 13/011,739: Amendment filed Dec. 17, 2013; 59 pages, Doc 1385.
U.S. Appl. No. 13/011,739: Termindal Disclaimer filed Mar. 19, 2014, 2 pages, Doc 1386.
U.S. Appl. No. 13/011,739: Termindal Disclaimer filed Mar. 21, 2014, 3 pages, Doc 1387.
U.S. Appl. No. 13/011,739: Notice of Allowance / Allowability dated Apr. 11, 2014, 17 pages, Doc 1388.
U.S. Appl. No. 13/011,739: Issue Fee Payment filed Jul. 7, 2014, 5 pages, Doc 1389.
U.S. Appl. No. 13/011,739: Issue Notification dated Jul. 23, 2014, 1page, Doc 1390.
U.S. Appl. No. 14/330,025, filed Jul. 14, 2014, 42 pages, Doc 1391.
U.S. Appl. No. 14/330,025: Filing Receipt dated Jul. 24, 2014, 3 pages, Doc 1395.
U.S. Appl. No. 14/330,025: Request for Corrected Filing Receipt filed Aug. 1, 2014, 10 pages, Doc 1396.
U.S. Appl. No. 14/330,025: Corrected Filing Receipt dated Aug. 7, 2014, 3 pages, Doc 1397.
U.S. Appl. No. 14/330,025: Notice of Publication dated Nov. 13, 2014, 1 page, Doc 1398.
U.S. Appl. No. 14/330,025: Non-final Office Action dated Apr. 10, 2015, 16 pages, Doc 1399.
U.S. Appl. No. 14/330,025: Amendment and Terminal Disclaimer filed Sep. 9, 2015, 58 pages, Doc 1400.
U.S. Appl. No. 14/330,025: Notice of Allowance / Allowability dated Dec. 22, 2015, 15 pages, Doc 1401.
U.S. Appl. No. 14/330,025: Issue Fee Payment filed Mar. 21, 2016, 5 pages, Doc 1402.
U.S. Appl. No. 14/330,025: Issue Notification dated Apr. 6, 2016, 1 page, Doc 1403.
U.S. Appl. No. 15/015,592, filed Feb. 4, 2016, 45 pages, Doc 1404.
U.S. Appl. No. 15/015,592: Filing Receipt dated Feb. 23, 2016, 3 pages, Doc 1405.
U.S. Appl. No. 15/015,592: Preliminary Amendment filed Apr. 8, 2016, 9 pages, Doc 1406.
U.S. Appl. No. 15/015,592: Notice of Publication dated Jun. 2, 2016, 1page, Doc 1407.
U.S. Appl. No. 15/015,592: Non-final Office Action dated Jun. 12, 2017, 30 pages, Doc 1408.
U.S. Appl. No. 15/015,592: Amendment filed Oct. 12, 2017, 11 pages, Doc 1409.
U.S. Appl. No. 15/015,592: Final Office Action dated Mar. 13, 2018, 32 pages, Doc 1410.
U.S. Appl. No. 15/015,592: Request for Continued Examination and Amendment filed May 14, 2018, 12 pages, Doc 1411.
U.S. Appl. No. 15/015,592: Terminal Disclaimer filed May 14, 2018, 4 pages, Doc 1412.
U.S. Appl. No. 15/015,592: Corrected Filing Receipt dated May 17, 2018, 3 pages, Doc 1413.
U.S. Appl. No. 15/015,592: Advisory Action dated May 25, 2018, 6 pages, Doc 1414.
U.S. Appl. No. 15/015,592: Request for Continued Examination filed Jun. 13, 2018, 6 pages, Doc 1415.
U.S. Appl. No. 15/015,592: Non-final Office Action dated Aug. 8, 2018, 21 pages, Doc 1416.
U.S. Appl. No. 15/015,592: Amendment filed Nov. 8, 2018, 10 pages, Doc 1417.
U.S. Appl. No. 15/015,592: Notice of Allowance / Allowability dated Dec. 26, 2018, 12 pages, Doc 1418.
U.S. Appl. No. 15/015,592: 312 Amendment filed Jan. 18, 2019, 8 pages, Doc 1419.

(56) References Cited

OTHER PUBLICATIONS

U.S. Appl. No. 15/015,592: Examiner Response to 312 Amendment dated Feb. 11, 2019, 3 pages, Doc 1420.
U.S. Appl. No. 15/015,592: Issue Fee Payment filed Mar. 25, 2019, 4 pages, Doc 1421.
U.S. Appl. No. 15/015,592: Issue Notification dated Apr. 17, 2019, 1 page, Doc 1422.
U.S. Appl. No. 16/379,558, filed Apr. 9, 2019, 46 pages, Doc 1423.
U.S. Appl. No. 16/379,558: Filing Receipt dated Apr. 24, 2019, 4 pages, Doc 1424.
U.S. Appl. No. 16/379,558: Notice of Publication dated Aug. 1, 2019, 1 pages, Doc 1426.
U.S. Appl. No. 16/379,558: Non-final Office Action dated Sep. 26, 2019, 21 pages, Doc 1427.
U.S. Appl. No. 16/379,558: Amendment and Terminal Disclaimer filed Jan. 22, 2020, 15 pages, Doc 1430.
U.S. Appl. No. 16/379,558: Notice of Allowance / Allowability dated Feb. 7, 2020, pages, Doc 1431.
U.S. Appl. No. 16/379,558: Amendment After Allowance filed Apr. 6, 2020, 9 pages, Doc 1432.
U.S. Appl. No. 16/379,558: Examiner Response to 312 Amendment dated Apr. 15, 2020, 7 pages, Doc 1433.
U.S. Appl. No. 16/379,558: Request for Continued Examination filed Apr. 30, 2020, 8 pages, Doc 1434.
U.S. Appl. No. 16/379,558: Notice of Allowance / Allowability dated May 13, 2020, 12 pages, Doc 1435.
U.S. Appl. No. 16/379,558: Request for Corrected Filing Receipt filed Jul. 9, 2020, 10 pages, Doc 1436.
U.S. Appl. No. 16/379,558: Corrected Filing Receipt dated Jul. 13, 2020, 4 pages, Doc 1437.
U.S. Appl. No. 16/379,558: Issue Fee Payment and 312 Amendment filed Aug. 11, 2020, 14 pages, Doc 1438.
U.S. Appl. No. 16/379,558: Examiner Response to 312 Amendment dated Aug. 19, 2020, 3 pages, Doc 1439.
U.S. Appl. No. 16/379,558: Issue Notification dated Sep. 2, 2020, 1page, Doc 1440.
U.S. Appl. No. 16/989,716, filed Aug. 10, 2020, 36 pages, Doc 1441.
U.S. Appl. No. 16/989,716: Filing Receipt and Notice of Missing Parts dated Aug. 18, 2020, 6 pages, Doc 1442.
U.S. Appl. No. 16/989,716: Response to Notice of Missing Parts and Preliminary Amendment filed Oct. 14, 2020, 18 pages, Doc 1443.
U.S. Appl. No. 16/989,716: Updated Filing Receipt dated Oct. 16, 2020, 4 pages, Doc 1444.
U.S. Appl. No. 16/989,716: Notice of Publication dated Jan. 21, 2021, 1 page, Doc 1445.
U.S. Appl. No. 16/989,716: Non-final Office Action dated Oct. 5, 2021, 18 pages, Doc 1446.
PCT Application PCT/US2011/022486: PCT Application filed Jan. 26, 2011, 26 pages, Doc 1447.
PCT Application PCT/US2011/022486: Notice of Publication dated Aug. 4, 2011, 24 pages, Doc 1449.
PCT Application PCT/US2011/022486: International Search Report and Written Opinion dated Aug. 9, 2012, 8 pages, Doc 1448.
AU Application No. 2100-209699: Patent Application filed Jul. 4, 2012, 29 pages, Doc 1180.
AU Application No. 2100-209699: Examination Report dated Sep. 13, 2013, 3 pages, Doc 1181.
AU Application No. 2100-209699: Amendment filed Oct. 31, 2013, 6 pages, Doc 1182.
AU Application No. 2100-209699: Examination Report dated Nov. 28, 2013, 6 pages, Doc 1183.
AU Application No. 2100-209699: Amendment filed Dec. 24, 2013, 41 pages, Doc 1184.
AU Application No. 2100-209699: Examination Report dated Jan. 22, 2014, 5 pages, Doc 1185.
AU Application No. 2100-209699: Amendment filed Mar. 9, 2014, 16 pages, Doc 1186.
AU Application No. 2100-209699: Examination Report dated Mar. 24, 2014, 6 pages, Doc 1187.
AU Application No. 2100-209699: Amendment filed Apr. 4, 2014, 16 pages, Doc 1188.
AU Application No. 2100-209699: Notice of Acceptance dated May 7, 2014, 2 pages, Doc 1189.
AU Application No. 2100-209699: Notice of Grant dated Sep. 4, 2014, 2 pages, Doc 1190.
AU Application No. 2100-209699: Patent Certificate dated Dec. 1, 2014, 1 page, Doc 1191.
CA Application 2787921: CA Application filed Jul. 23, 2012, 33 pages, Doc 1452.
CA Application 2787921: Office Action dated Jan. 30, 2017, 5 pages, Doc 1453.
CA Application 2787921: Amendment filed Jul. 18, 2017, 11 pages, Doc 1454.
CA Application 2787921: Office Action dated Dec. 28, 2017, 4 pages, Doc 1455.
CA Application 2787921: Amendment filed Jun. 26, 2018, 16 pages, Doc 1456.
CA Application 2787921: Office Action dated May 28, 2019, 4 pages, Doc 1457.
CA Application 2787921: Amendment filed Jul. 31, 2019, 16 pages, Doc 1458.
CA Application 2787921: Patent Granted dated Mar. 24, 2020, 1 page, Doc 1459.
EP Application 11737535: EP Application filed Aug. 9, 2012, 28 pages, Doc 1460.
EP Application 11737535: European Search Report and Opinion, 5 pages, Doc 1461.
EP Application 11737535: Amendment filed May 20, 2015, 22 pages, Doc 1462.
EP Application 11737535: Article 94(3) Communication dated Jan. 4, 2016, 3 pages, Doc 1463.
EP Application 11737535: Response to Article 94(3) Communication filed Apr. 25, 2016, 67 pages, Doc 1464.
EP Application 11737535: Intention to Grant dated Oct. 5, 2016, 8 pages, Doc 1465.
EP Application 11737535: Decision to Grant European Patent dated Mar. 30, 2017, 2 pages, Doc 1466.
HK Application 12112637.0: HK Application filed May 4, 2013, 25 pages, Doc 1468.
HK Application 12112637.0: HK Granted Patent dated Apr. 27, 2018, 2 pages, Doc 1469.
JP Application 2012-551244: JP National Phase Application filed Sep. 5, 2012, 20 pages, Doc 1471.
JP Application 2012-551244: Office Action dated Dec. 11, 2013, 4 pages, Doc 1369.
JP Application 2012-551244: Amendment filed Jan. 7, 2014, 8 pages, Doc 1472.
JP Application 2012-551244: Office Action dated May 13, 2014, 5 pages, Doc 1473.
JP Application 2012-551244: Amendment and Request for Trial and Appeal filed Aug. 25, 2014, 2 pages, Doc 1474.
JP Application 2012-551244: Decision to Grant a Patent dated Sep. 16, 2014, 2 pages, Doc 1475.
SG Application SG2012050449: Published Application dated Aug. 30, 2012, 19 pages, Doc 1476.
U.S. Appl. No. 15/269,287, filed Sep. 19, 2016, 83 pages, Doc 1477.
U.S. Appl. No. 15/269,287: Filing Receipt dated Sep. 29, 2016, 3pages, Doc 1478.
U.S. Appl. No. 15/269,287: Notice of Publication dated Mar. 23, 2017, 1 page, Doc 1479.
U.S. Appl. No. 15/269,287: Notice of Allowance / Allowability dated May 25, 2018, 14 pages, Doc 1480.
U.S. Appl. No. 15/269,287: Amendment After Allowance filed Jul. 24, 2018, 14 pages, Doc 1481.
U.S. Appl. No. 15/269,287: Corrected Filing Receipt dated Jul. 26, 2018, 3 pages, Doc 1482.
U.S. Appl. No. 15/269,287: Examiner Response to 312 Amendment dated Aug. 6, 2018, 3 pages, Doc 1483.
U.S. Appl. No. 15/269,287: Issue Fee Payment filed Aug. 24, 2018, 5 pages, Doc 1484.

(56) References Cited

OTHER PUBLICATIONS

U.S. Appl. No. 15/269,287: Issue Notification dated Sep. 5, 2018, 1 page, Doc 1485.
U.S. Appl. No. 16/115,281, filed Aug. 28, 2018, 73 pages, Doc 1486.
U.S. Appl. No. 16/115,281: Filing Receipt dated Sep. 14, 2018, 3 pages, Doc 1487.
U.S. Appl. No. 16/115,281: Terminal Disclaimer filed and Accepted filed Nov. 1, 2018, 5 pages, Doc 1488.
U.S. Appl. No. 16/115,281: Notice of Allowance / Allowability dated Nov. 21, 2018, 15 pages, Doc 1489.
U.S. Appl. No. 16/115,281: Notice of Publication dated Dec. 20, 2018, 1 page, Doc 1490.
U.S. Appl. No. 16/115,281: Issue Fee Payment filed Feb. 14, 2019, 10 pages, Doc 1491.
U.S. Appl. No. 16/115,281: Issue Notification dated Mar. 13, 2019, 1 page, Doc 1492.
U.S. Appl. No. 16/268,243, filed Feb. 5, 2019, 72 pages, Doc 1493.
U.S. Appl. No. 16/268,243: Filing Receipt and Notice to File Corrected Application Papers dated Mar. 12, 2019, 6 pages, Doc 1494.
U.S. Appl. No. 16/268,243: Filing Receipt and Notice to File Corrected Application Papers dated Mar. 12, 2019, 6 pages, Doc 1495.
U.S. Appl. No. 16/268,243: Amendment and Response Notice to File Corrected Application Papers filed May 9, 2019, 16 pages, Doc 1496.
U.S. Appl. No. 16/268,243: Non-final Office Action dated Jul. 10, 2019, 22 pages, Doc 1497.
U.S. Appl. No. 16/268,243: Notice of Publication dated Aug. 22, 2019, 1 page, Doc 1498.
U.S. Appl. No. 16/268,243: Amendment and Terminal Disclaimer filed Oct. 9, 2019, 11 pages, Doc 1499.
U.S. Appl. No. 16/268,243: Notice of Allowance / Allowability dated Nov. 27, 2019, 6 pages, Doc 1500.
U.S. Appl. No. 16/268,243: Issue Fee Payment filed Feb. 26, 2020, 6 pages, Doc 1501.
U.S. Appl. No. 16/268,243: Issue Notification dated Mar. 18, 2020, 1 page, Doc 1502.
U.S. Appl. No. 16/817,157, filed Mar. 12, 2020, 67 pages, Doc 1503.
U.S. Appl. No. 16/817,157: Filing Receipt and Notice to File Missing Parts dated Mar. 26, 2020, 6 pages, Doc 1504.
U.S. Appl. No. 16/817,157: Updated Filing Receipt dated Jul. 31, 2020, 4 pages, Doc 1505.
U.S. Appl. No. 16/817,157: Non-final Office Action dated Oct. 28, 2020, 24 pages, Doc 1506.
U.S. Appl. No. 16/817,157: Notice of Publication dated Nov. 5, 2020, 1 page, Doc 1507.
U.S. Appl. No. 16/817,157: Amendment filed Feb. 16, 2021, 13 pages, Doc 1508.
U.S. Appl. No. 16/817,157: Supplemental Amendment filed Jun. 9, 2021, 12 pages, Doc 1509.
U.S. Appl. No. 16/817,157: Supplemental Amendment and Terminal Disclaimer filed Aug. 17, 2021, 15 pages, Doc 1510.
U.S. Appl. No. 16/817,157: Notice of Allowance / Allowability dated Aug. 27, 2021, 6 pages, Doc 1511.
U.S. Appl. No. 16/817,157: Issue Fee Payment and Comments Under 1.312 filed Nov. 29, 2021, 7 pages, Doc 1512.
U.S. Appl. No. 16/817,157: Issue Notification dated Dec. 15, 2021, 1 page, Doc 1513.
U.S. Appl. No. 17/315,081, filed May 7, 2021, 67 pages, Doc 1514.
U.S. Appl. No. 17/315,081: Filing Receipt and Notice to File Missing Parts dated Mar. 26, 2020, 6 pages, Doc 1515.
U.S. Appl. No. 17/315,081: Updated Filing Receipt dated Jul. 31, 2020, 4 pages, Doc 1516.
U.S. Appl. No. 17/315,081: Non-final Office Action dated Oct. 28, 2020, 24 pages, Doc 1517.
U.S. Appl. No. 17/315,081: Amendment filed Feb. 26, 2021, 13 pages, Doc 1518.
U.S. Appl. No. 17/315,081: Supplemental Amendment filed Jun. 9, 2021, 13 pages, Doc 1519.
U.S. Appl. No. 17/315,081: Supplemental Amendment filed Aug. 17, 2021, 15 pages, Doc 1520.
U.S. Appl. No. 17/315,081: Notice of Allowance / Allowability dated Aug. 27, 2021, 6 pages, Doc 1521.
U.S. Appl. No. 17/315,081: Issue Fee Payment and Comments Under 1.312 filed Nov. 29, 2021, 7 pages, Doc 1522.
U.S. Appl. No. 17/315,081: Issue Notification dated Dec. 15, 2021, 1 page, Doc 1523.
U.S. Appl. No. 17/537,064, filed Nov. 29, 2021, 75 pages, Doc 1524.
U.S. Appl. No. 17/537,064: Filing Receipt dated Dec. 10, 2021, 4 pages, Doc 1525.
U.S. Appl. No. 17/537,064: Notice of Publication dated Mar. 17, 2022, 1 page, Doc 1526.
U.S. Appl. No. 14/687,327, filed Apr. 15, 2015, 64 pages, Doc 1527.
U.S. Appl. No. 14/687,327: Filing Receipt dated Apr. 28, 2015, 3 pages, Doc 1528.
U.S. Appl. No. 14/687,327: Non-final Office Action dated Jul. 1, 2016, 14 pages, Doc 1529.
U.S. Appl. No. 14/687,327: Notice of Publication dated Oct. 20, 2016, 1 page, Doc 1530.
U.S. Appl. No. 14/687,327: Amendment filed Nov. 1, 2016, 21 pages, Doc 1531.
U.S. Appl. No. 14/687,327: Notice of Allowance / Allowability dated Nov. 22, 2016, 8 pages, Doc 1532.
U.S. Appl. No. 14/687,327: Corrected Notice of Allowability dated Dec. 27, 2016, 6 pages, Doc 1533.
U.S. Appl. No. 14/687,327: Issue Fee Payment filed Feb. 22, 2017, 5 pages, Doc 1534.
U.S. Appl. No. 14/687,327: Issue Notification dated Mar. 15, 2017, 1 page, Doc 1535.
U.S. Appl. No. 15/443,900, filed Feb. 27, 2017, 62 pages, Doc 1536.
U.S. Appl. No. 15/443,900: Filing Receipt and Notice to File Missing Parts dated Mar. 8, 2017, 5 pages, Doc 1537.
U.S. Appl. No. 15/443,900: Preliminary Amendment filed May 17, 2017, 11 pages, Doc 1538.
U.S. Appl. No. 15/443,900: Updated Filing Receipt dated May 19, 2017, 3 pages, Doc 1539.
U.S. Appl. No. 15/443,900: Corrected Filing Receipt dated Jul. 14, 2017, 3 pages, Doc 1540.
U.S. Appl. No. 15/443,900: Notice of Publication dated Aug. 24, 2017, 1 page, Doc 1541.
U.S. Appl. No. 15/443,900: Non-final Office Action dated Jan. 25, 2019, 5 pages, Doc 1542.
U.S. Appl. No. 15/443,900: Amendment and Terminal Disclaimer filed Mar. 5, 2019, 17 pages, Doc 1543.
U.S. Appl. No. 15/443,900: Notice of Allowance / Allowability dated Apr. 12, 2019, 8 pages, Doc 1544.
U.S. Appl. No. 15/443,900: Issue Fee Payment filed Jul. 9, 2019, 5 pages, Doc 1545.
U.S. Appl. No. 15/443,900: Issue Notification dated Aug. 7, 2019, 1 page, Doc 1546.
U.S. Appl. No. 16/521,374, filed Jul. 24, 2019, 64 pages, Doc 1547.
U.S. Appl. No. 16/521,374: Filing Receipt dated Aug. 7, 2019, 4 pages, Doc 1548.
U.S. Appl. No. 16/521,374: Notice of Publication dated Nov. 14, 2019, pages, Doc 1549.
U.S. Appl. No. 16/521,374: Non-final Office Action dated Feb. 4, 2021, 12 pages, Doc 1550.
U.S. Appl. No. 16/521,374: Corrected Filing Receipt dated Feb. 11, 2021, 3 pages, Doc 1551.
U.S. Appl. No. 16/521,374: Amendment and Terminal Disclaimer filed Apr. 29, 2021, 22 pages, Doc 1552.
U.S. Appl. No. 16/521,374: Notice of Allowance / Allowability dated May 13, 2021, 8 pages, Doc 1553.
U.S. Appl. No. 16/521,374: Corrected Notice of Allowability dated May 25, 2021, 2 pages, Doc 1554.
U.S. Appl. No. 16/521,374: Request for Continued Examination filed Aug. 13, 2021, 3 pages, Doc 1555.
U.S. Appl. No. 16/521,374: Notice of Allowance / Allowability dated Sep. 7, 2021, 8 pages, Doc 1556.

(56) References Cited

OTHER PUBLICATIONS

U.S. Appl. No. 16/521,374: Issue Fee Payment filed Dec. 7, 2021, 3 pages, Doc 1557.
U.S. Appl. No. 16/521,374: Issue Notification dated Dec. 21, 2021, 1page, Doc 1558.
U.S. Appl. No. 17/561,616, filed Dec. 23, 2021, 58 pages, Doc 1559.
U.S. Appl. No. 17/561,616: Filing Receipt and Notice to File Missing Parts dated Jan. 11, 2022, 5 pages, Doc 1560.
U.S. Appl. No. 17/561,616: Preliminary Amendment and Response to Notice of Missing Parts filed Mar. 10, 2022, 12 pages, Doc 1561.
U.S. Appl. No. 17/561,616: Updated Filing Receipt dated Mar. 14, 2022, 3 pages, Doc 1562.
U.S. Appl. No. 17/315,081: Restriction/Election Requirement dated Mar. 16, 2023, 5 pages, Doc 1517.
U.S. Appl. No. 17/537,064: Non-Final Office Action dated Mar. 16, 2023, 59 pages, Doc 1518.
U.S. Appl. No. 17/561,616: Non-Final Office Action dated Feb. 16, 2023, 35 pages, Doc 1519.
U.S. Appl. No. 17/315,081: Non-Final Office Action dated Jun. 22, 2023, 60 pages, Doc 1913.
U.S. Appl. No. 17/537,064: Response to Non-Final Office Action filed Jun. 15, 2023, 25 pages, Doc 1914.
U.S. Appl. No. 17/537,064: Final Office Action dated Aug. 17, 2023, 47 pages, Doc 1915.
U.S. Appl. No. 17/561,616: Response to Non-Final Office Action filed May 15, 2023, 18 pages, Doc 1916.

\* cited by examiner

IDENTITY VERIFICATION PLATFORM

RELATED APPLICATIONS

This application claims priority to U.S. provisional patent application No. 62/956,020, filed Dec. 31, 2019, which is incorporated by reference herein in its entirety and for all purposes.

BACKGROUND

1. Field

The present disclosure relates generally to electronic and/or communication infrastructures and, more particularly, to an identity verification platform, which may operate to authenticate, authorize, and/or verify the identity and/or trustworthiness of a user of a particular account, for example, which may include a financial account, a mobile account, a service account, or the like.

2. Information

The World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, or the like is continually being acquired, identified, located, retrieved, collected, stored, communicated, etc. In a society in which commerce takes place on a grand scale, occurrences of fraud, unfortunately, are a fact of life. Thus, to at least partially combat fraud, various processes and/or procedures exist, such as, for example, in connection with everyday transactions, including financial transactions, but also including online transactions and/or in-store purchases, which may include goods and/or services. Likewise, in a world in which various electronic devices typically used for communication, such as mobile communications devices, tablets, laptop computers, etc., have become ubiquitous, the types of possible fraud have, in at least some instances, become more complex. Thus, possible fraud may involve use and/or knowledge of complex technology, for example, related to the particular hardware and/or software platforms associated with such cellular telephones, tablets, laptop computers, etc.

In addition, exchange of sensitive content may represent a significant vulnerability in modern systems attempting to reduce fraud. As a result of requiring that sensitive content be transmitted between parties and/or organizations, such information may be exposed to multiple potential attacks, which may originate from inside and/or outside of these or similar parties and/or organizations. For example, as consumer privacy laws evolve, more and more parties and/or organizations may be hesitant, or may outright refuse, to allow sensitive content to leave their data center for any reason in view of a perceived risk of prosecution and/or fines under harsh provisions of privacy laws. For example, the General Data Protection Regulation 2016/679 (GDPR) in Europe provides a mandatory minimum fine of twenty-million Euro fine for each data loss event. California's recent bill for consumer privacy is based on the GDPR. It may this be appreciated that the possible exposure of sensitive content to unauthorized parties represents an area of genuine concern. With this in mind, techniques to minimize the risk of fraud, including fraud that may occur online or by way of other electronic means, while reducing or minimizing exposure and/or likelihood the interception of sensitive content by unauthorized parties, continues to be an active area of investigation.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
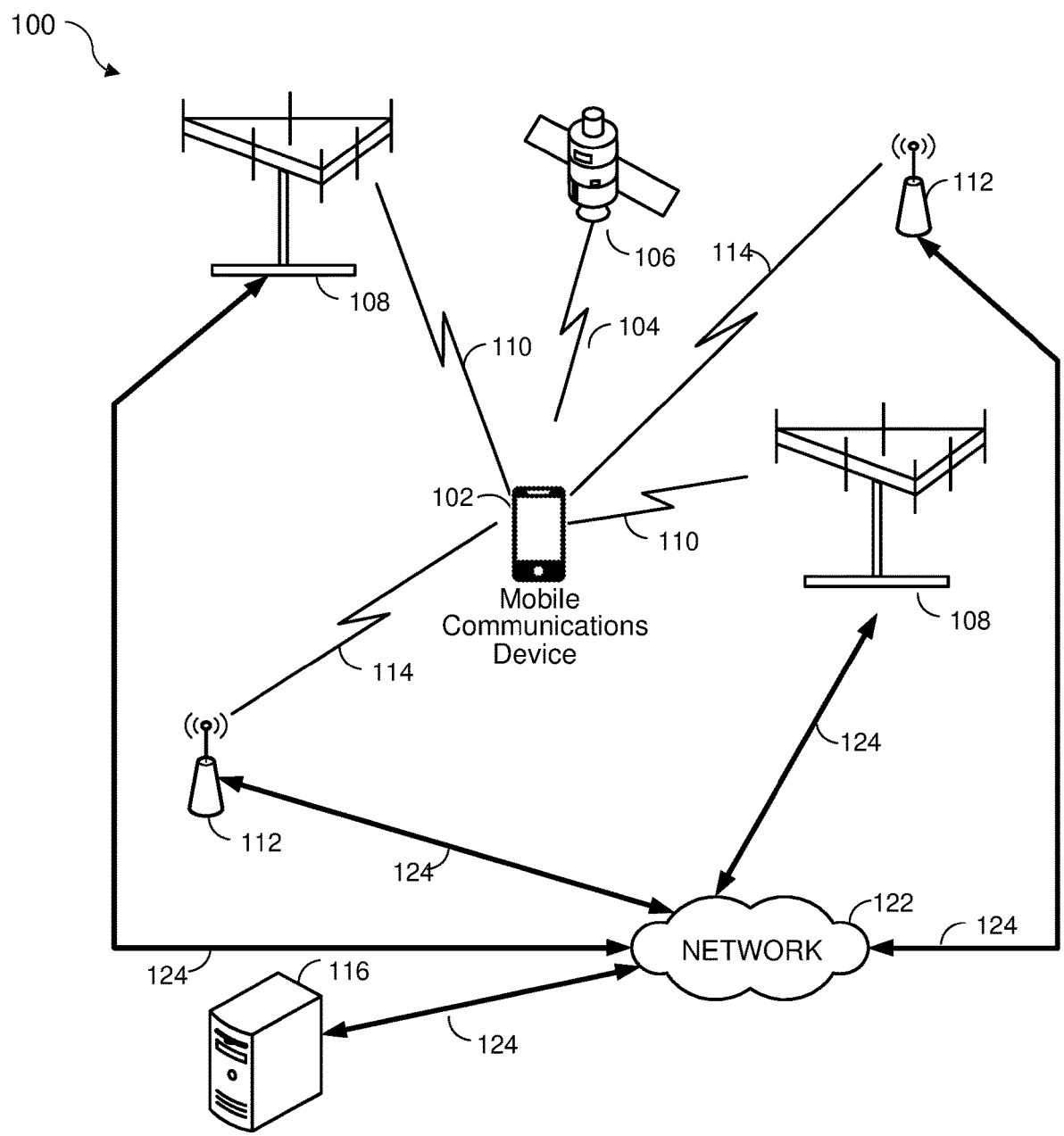
FIG. 1 is a schematic diagram illustrating features of an example communications infrastructure, which may facilitate an identity verification platform, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, or the like described are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for implementing an identity verification platform, such as via one or more computing and/or communication networks and/or protocols (e.g., network protocols) discussed herein. As will be seen, in some instances, operations and/or techniques for implementing an identity verification platform, may be implemented, at least in part, to authenticate, authorize and/or verify an identity and/or trustworthiness of a user of a particular account. Such accounts may include, for example, a financial account, a mobile account, a service account, or the like. In this context, a "user" refers to a person, such as a user of a mobile communications device, and/or an entity to be verified. For example, a user may comprise an end user, such as a customer, subscriber, purchaser, or the like. Thus, it should be noted that throughout this document terms such as user, subscriber, customer, and/or similar terms may be used interchangeably without loss of meaning and/or understanding unless particular context of usage suggests otherwise.

As also discussed below, one or more operations and/or techniques for implementing an identity verification platform within an electronic infrastructure may allow a particular institution or organization, such as a bank to verify identity and/or trustworthiness of a user. Such verification may be achieved by utilizing sensitive content or data held by a particular data source, such as a mobile communication services carrier, for example, without exposing such sensitive content to the institution or organization. In addition, such identity verification, may be achieved without exposing the data held by the institution or organization to the data source. In this context, "data source" refers to a source of sensitive content (e.g., private consumer content, personally identifiable information, premium entertainment content, etc.) that is accepted as being canonical, trustworthy, or otherwise accepted as being accurate and/or authoritative. As was indicated, at times, a data source may be incentivized (e.g., via consumer privacy laws, etc.) to restrict access of sensitive content, such as private consumer content, to parties outside of their immediate control. Such access restrictions may be imposed for legal reasons, contractual obligations, or for other reasons, and claimed subject matter is not limited in this respect. For example, a data source may restrict access to sensitive content by identity verifiers since the data source may lack trust in the ability of the identity verifier maintain confidentiality under all circumstances. In this context, "identity verifier" or "verifier" refers to an entity facilitating and/or supporting identity verification of a user. In some instances, an identity verifier may include, for example, a mobile communication services carrier, aggregator of mobile subscriber accounts, or any other verification service (e.g., third-party, etc.).

"Content," "sensitive content," "data," "electronic content," or "private consumer content", as these terms are used herein, should be interpreted broadly and refer to signals, such as signal packets, for example, and/or states, such as physical states on a memory device, for example. Such terms are to be employed in a manner irrespective of format, such as by way of any expression, representation, realization, and/or communication, for example. Sensitive content, such as private consumer content, may comprise, for example, any information, knowledge, and/or experience, such as, again, in the form of signals and/or states, physical or otherwise. In this context, "electronic" or "online" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, multimedia, or the like. Thus, sensitive content, such as private consumer content, may be stored and/or transmitted electronically, such as before or after being perceived by human senses. In general, it may be understood that sensitive content in an electronic form may be intended to be referenced in a particular discussion, although in the particular context, the term "content" may be employed for ease of discussion. Specific examples of content may include, for example, computer code, metadata, messages, text, audio file, video file, data file, web page, multimedia files, or the like and claimed subject matter is not limited in this respect.

As alluded to previously, in a society in which commerce takes place on a grand scale, occurrences of fraud, unfortunately, are increasing in frequency. Thus, to reduce the incidence of such fraud, various processes and/or procedures have been developed, such as, for example, in connection with everyday transactions, including financial transactions. Such processes and/or procedures may extend to other types of online transactions and/or in-store purchases, which may include goods and/or services, simply as a few illustrative examples. Likewise, in a world in which various electronic devices typically used for communication, such as mobile cellular telephones, tablets, laptop computers, etc., are ubiquitous, the types of possible fraud have, in at least some instances, become more complex. Occurrences of fraud may involve the use and/or knowledge of complex technology, for example, which may be related to the particular hardware and/or software platforms associated with such cellular telephones, tablets, laptop computers, etc. Thus, a need for ways to reduce the risk of fraud, including fraud that may occur online and/or electronically, continues to be an active area of investigation.

One approach toward reducing the risk of potential fraud relates to identity authentication, authorization, and/or verification of a user, customer, subscriber, or purchaser, typically before completing a transaction (e.g., in place of or in addition to) a typical log-in. In this context, the term "transaction" (or similar term) refers to a set of communications and/or actions that take place between at least two parties that reciprocally affect and/or influence the parties involved in the transaction. Entities that provide identity verification services are referred to herein are as identity verifiers or similar terms. These terms are intended to encompass agents of identity verification that may otherwise exist as separate entities. For example, an agent may include an entity that facilitates and/or supports a particular service, such as an identity verification service, via organizing and/or participating in one or more transactions between two other parties (e.g., a bank and a carrier, etc.). In this context, it is to be understood that identity verification may be requested for a significant number of users for corresponding number of possible situations. For example, millions, tens of millions, hundreds of millions or even more requests may be submitted on a daily basis, for example. Therefore, consistent and workable approaches and/or processes, rather than uniquely customized approaches and/or processes that may otherwise vary by request, may be desired with a large volume of requests.

As shall be discussed, identity verification is simply one possible approach to reduce the risk of fraud. Other approaches or portions thereof, such as authentication, authorization, validation, audit, or the like may also be used herein, in whole or in part, such as part of, in addition to, and/or in conjunction with identity verification. With respect to identity verification, in a worldwide electronic communications environment, a subscriber to a mobile communications service carrier may establish an identity with such a carrier and/or with a third party. Such third parties may include, but are not limited to, an online merchant, who may be willing to interact with a user (e.g., customer, subscriber, purchaser, etc. to sell, extend services, provide access to content, etc.) if an identity is to be verified. In many instances, given the nature of certain transactions, especially in a communications environment in which transactions take place via communications network around the clock and at remote locations, it may be useful to perform identity verification relatively quickly, such as in a real-time (or near real time) fashion.

As a general matter, authentication, authorization, and/or verification of a mobile subscriber, may be desirable if an institution or organization (e.g., third party, etc.) wishes to verify the identity of a user (e.g., mobile subscriber). Identity verification typically relies on verifying (e.g., authenticating, authorizing, auditing, etc.) an existing bind and/or association to a persistent mobile identifier, as demonstrated below through illustrative examples. In this context, the term "bind," association or similar terms, refer to a persistent, continuing and objectively verifiable relationship between a user/subscriber (e.g., person, entity, etc.) and a mobile identity, including, as an example, a mobile subscriber and a bank or other financial institution or organization holding his or her bank account. Thus, a subscriber account identifier, may be employed to represent a mobile identity. The term mobile subscriber account identity and/or similar terms in this context refer to an identity that relies on a mobile account relationship (also referred to as a bind and/or association) of a user as a source of verification and is capable of being verified by another (e.g., a third-party identity verifier). The term mobile account and/or similar terms in this context refer to a mobile service provider account. Likewise, the terms communication services carrier and mobile subscriber network operator may be used interchangeably. Furthermore, in this context, the term wireless carrier, common carrier, or simply carrier refers to an entity in telecommunications that provides wired and/or wireless communication services to the general public for a fee. Thus, while a carrier may correspond to a mobile communication services provider and/or mobile network operator; there are examples of carriers that are not mobile service providers and/or mobile network operators. Nonetheless, the term carrier may be used in place of mobile service provider and/or mobile network operate without a loss in meaning and/or understanding. In any given situation, particular context of usage should indicate if carrier is being used in its most general sense or in a narrow sense, such as referring to a mobile service provider and/or mobile network operator, for example.

It is noted that while a bind need not be permanent, it should have some amount of persistence to be of use in this context. Other aspects of subscriber authentication, authorization, and/or verification are described herein. As noted, in an embodiment, verification, such as mobile subscriber identity verification, may relate to a mobile account and/or a mobile subscriber, for example. As mentioned, a mobile account is one example of a type of account, especially in an online world, although claimed subject matter is not intended to be limited to online accounts or mobile accounts. Rather, the term "account" in this context refers to a formal business arrangement between an entity and/or person and a provider of the account in order to accomplish a business purpose. It is noted, for clarification, that in some situations, a person may represent an entity, for example. Likewise, in some situations, a person and an entity may be distinct. Further, the term account is to be read broadly and may include a service account, a financial account, an account relating to access to content, as just a few illustrative examples. Thus, continuing with non-limiting examples, an account, in various embodiments, may, for example, be employed with respect to purchase of goods and/or services, access to content, access to financial accounts, access to medical records, access to corporate or organizational intellectual property and/or other types of records and/or files, access to other services, etc.

Likewise, an account may comprise attributes associated with or corresponding to the account. In this context, the term "subscriber account identifier" refers to a unique descriptor or feature associated with the account that at least partially defines certain aspects of the account. For example, as nonlimiting illustrations, with respect to a mobile device user, a subscriber account identifier may include a mobile telephone number, a mobile subscriber unique alias, an international mobile subscriber identifier (IMSI), Integrated Circuit Card Identifier (ICC ID), and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example. Other examples of mobile subscriber account identifiers may include an international mobile equipment identifier (IMEI), a mobile equipment identifier or any other identifier a mobile billing account number/identifier.

Although the discussion that follows relates to any type of account, as a non-limiting illustration, mobile accounts shall be used for illustration. It is understood, of course, that claimed subject matter is intended to not be limited to examples provided primarily for purposes of illustration, since such examples may be oversimplified for purposes of comprehension, for example. As was mentioned previously, with respect to commerce, including, of course, mobile accounts, a risk of fraud and/or unauthorized actions taking place is present or at least a risk exists of attempts being made.

The following provides a few illustrative examples of accounts in which a risk of fraud and/or unauthorized actions may be present. In scenarios, user may log into a bank account via a web browser or an executable application on a mobile device, for example. In response to receipt of signals initiated by the user, a financial institution, for example, may utilize an application programming interface (API) substantially compatible and/or substantially compliant with HTTP and/or HTTPS, including versions now known and/or to be later developed, and/or another suitable protocol (e.g., now known and/or to later be developed). In such an example, a user may seek to take one or more actions with respect to an account, for example, to transfer funds, view a history of transactions, make a payment, update sensitive content, etc.

In another illustration, a mobile communication services subscriber may seek to access an existing account with a merchant. In response, a merchant, such as a provider of online music or other provider of entertainment-related content, may seek a form of payment, such as via a credit account (e.g., credit card) that may already be on record with the merchant. In another illustration, a user may seek to access a mobile device, for example, to create, share, and/or edit a file.

Thus, as suggested, a mobile communication services subscriber may seek to access, for example, an online account. A third party, such as those who may provide access to such an accounts, may seek to provide access control so as to maintain confidentiality of sensitive content. In an example, a software company and/or product, such as a developer of tax-preparation software products, may permit individual (access controlled) user accounts to be established. In another instance, a user may desire to access content, such as content corresponding to sensitive content (e.g., provided by a user to a social media account). In another instance, a user may return to a website and/or application, in which access to the website could be dependent, at least partially, on binding a user to a website and/or with an application, such as via an subscriber account identifier for the user. Thus, a third party may comprise a customer care facility of an enterprise, for example, such as a customer-care facility of a bank, in which an account is established.

The foregoing examples and many more accounts are subject to risk associated with fraud and/or unauthorized actions by an unscrupulous individual. Continuing with this example, therefore, an unscrupulous individual may desire to modify one or more aspects of a particular mobile services account. For example, the unscrupulous individual may desire to create or assume a false identity as an owner of an account. As mentioned previously, one way to mitigate such risks may be to employ authentication, authorization, and/or verification, which may include mobile identity verification of trustworthiness of a mobile services subscriber. Also as previously mentioned, authentication, authorization, and/or verification processes and/or procedures may include communicating (e.g., exchanging, etc.) content related to a particular user and/or entity over a communications network. For example, while mobile communication services subscribers interact with an institution, the subscriber may provide certain sensitive content, so as to verify the subscriber's identity. Such content may often include uniquely-identifiable values to identify a person, for example, and may this be referred to as personally identifiable information. Such identifiers may include but are not limited to a phone number, a Social Security number, email address, Internet protocol (IP) address or the like. Additionally, such identifiers may include a group of values, for example. Such identifiers may include but are not limited to physical address, an electronic mail address, a first name, a date of birth, and so forth.

Thus, as will be discussed in greater detail below, in an implementation, one or more operations and/or techniques for an identity verification platform may be implemented. An identity verification platform may be implemented to verify identity and/or trustworthiness of a user of a particular account, for example, which may include a financial account, a mobile communications device subscriber account, a service account, or the like. As is also discussed below, one or more techniques for an identity verification platform may permit an institution or organization, such as a financial institution, to verify identity and/or trustworthiness of a user by using sensitive content held by a particular data source. Data sources may include canonical data sources, such as data sources curated by mobile communication services carrier, for example, without exposing such sensitive content from such data sources to the institution or organization. Identity verification may be accomplished without exposing the institution's or the organization's data to the data source. In some instances, an identity verification platform may, for example, be implemented in such a way that sensitive content held by a particular data source may be exclusively co-located or under the exclusive control of a particular mobile communication services carrier. These results can be achieved, according to an embodiment disclosed herein, within a telecommunications infrastructure, such as shown in FIG. 1.

FIG. 1 is a schematic diagram illustrating features associated with an implementation of an example communications infrastructure, which may facilitate an identity verification platform, according to an embodiment. Processes and/or operations for an identity verification platform may be implemented, at least in part, to validate identity of a mobile communication services subscriber utilizing a mobile communications device referenced herein at 102. As used herein, "mobile communication device," "mobile computing device," or "mobile device" may be used interchangeably and refer to any kind of special purpose computing platform and/or apparatus that may from time to time have a position or location that changes. As a way of illustration, mobile devices may include, for example, cellular telephones, smart telephones, laptop computers, personal entertainment systems, tablet personal computers (PC), personal audio or video devices, personal navigation devices, Internet of Things (IoT) devices, or the like. It should be appreciated, however, that these are merely examples of mobile devices that may be used, at least in part, to implement one or more operations and/or techniques for implementing an identity verification platform, and that claimed subject matter is not limited in this regard.

It should be appreciated that operating a communications infrastructure 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to a particular network and/or operating environment. For example, in some instances, an optical network may be used herein, in whole or in part, such as separately and/or in any suitable combination with one or more networks discussed herein. Thus, depending on an implementation, one or more operations and/or techniques for implementing an identity verification platform.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a wireless communication network. In one example, mobile device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. Similarly, local transceiver 112 may comprise, for example, a wireless transmitter and/or receiver capable of transmitting and/or receiving wireless signals. For example, as will be seen, at times, wireless transceiver 112 may be capable of obtaining one or more observations from one or more other terrestrial transmitters.

In a particular implementation, local transceiver 112 may communicate with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). In another example implementation, local transceiver 112 may comprise a femtocell or picocell capable of facilitating communication via link 114 according to an applicable cellular or like wireless communication protocol. It should be understood that these are merely examples of networks that may communicate with mobile device 102 over a wireless link, and claimed subject matter is not limited in this respect. For example, in some instances, communications infrastructure 100 may include a larger number of base station transceivers 108, local transceivers 112, etc.

In an implementation, base station transceiver 108 and local transceiver 112 may communicate with server 116 over a network 122 via one or more links 124. Network 122 may comprise, for example, combinations of wired or wireless communication links. In a particular implementation, network 122 may comprise, for example, a network capable of implementing an Internet Protocol (IP) infrastructure capable of facilitating or supporting communication between mobile device 102 and server 116 via local transceiver 112, base station transceiver 108, etc. In another implementation, network 122 may comprise, for example cellular communication network infrastructure, such as a base station controller or master switching center to facilitate and/or support mobile cellular communication with mobile device 102. Server 116 may comprise one or more database servers (e.g., for a data source, agent, identify verifier, carrier, etc.), update servers, back-end servers, management servers, archive servers, location servers, positioning assistance servers, navigation servers, map servers, crowdsourcing servers, network-related servers, or the like.

In particular implementations, mobile device 102 may have circuitry or processing resources capable of determining a position fix or estimated location of mobile device 102, initial (e.g., a priori) or otherwise. For example, if satellite signals 104 are available, mobile device 102 may compute a position fix based, at least in part, on pseudo range measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more of servers 116 positioning assistance data to aid in the acquisition of signals 104 transmitted by SPS satellites 106 including, for example, almanac, ephemeris data, Doppler search windows, just to name a few examples.

Even though a certain number of computing platforms and/or devices are illustrated herein, any number of suitable computing platforms and/or devices may be implemented to facilitate and/or support one or more techniques and/or processes associated with communications infrastructure 100. For example, at times, network 122 may be coupled to one or more wired or wireless communication networks (e.g., WLAN, etc.) so as to enhance a coverage area for communications with mobile device 102, one or more base station transceivers 108, local transceiver 112, server 116, or the like. In some instances, network 122 may facilitate and/or support femtocell-based operative regions of coverage, for example. Again, these are merely example implementations, and claimed subject matter is not limited in this regard.

Thus, as was indicated, one or more operations and/or techniques for implementing an identity verification platform may be implemented to allow an institution or organization (e.g., a financial institution, etc.) to verify identity and/or assess the trustworthiness of a user by using sensitive content held by an canonical data source. An identity verification platform may be implemented so as to prohibit exposure of sensitive content, such as sensitive content (e.g., personally identifiable information), from the data source to the institution or organization. Identity verification may additionally prohibit exposure of the institution's (or organization's) content to the data source. An identity verification platform may be implemented in such a way that sensitive content held by a particular data source may be under the exclusive control of, for example, a mobile communication device services carrier. In some instances, being under the exclusive control of a communication device services carrier may involve (or even necessitate) co-location of an identity verification platform with processing resources of a mobile communication device services carrier. Thus, at times, one or more data stores (e.g., database) of an identity verification platform may be inaccessible to outside parties.

In an implementation, an institution or organization (such as a financial institution) may seek to authenticate, authorize, and/or verify an identity of a mobile communication services subscriber as part of a transaction. Such verifications, for example, may involve electronically communicating sensitive content to an identity verifier. In some instances, to authenticate, authorize, and/or verify identity of a subscriber, an institution or organization may convey sensitive content along a communications network, thus, creating one or more security risks or concerns, as discussed above. Thus, one or more operations and/or techniques for implementing an identity verification platform may be used, in whole or in part, to mitigate security risks or concerns.

For example, in an implementation, responsive to sensitive content, such as private consumer content, being received at an identity verification platform, the platform may utilize a unique identifier to determine an appropriate data source (or sources) to verify a mobile subscriber identity. In some instances, such as responsive to a data source corresponding to a trusted (e.g., canonical) data source, for example, a verifier may, for example, perform one or more operations and/or processes, such as via one or more particular implementations.

In an implementation, a subscriber account identifier may be used, such as by a requesting agent to prepare and/or store previously known information relevant (or private to) to a user-specific historical interactions, for example. In some instances, such sensitive content may be integrated into a single set of parameters that include sensitive content (e.g., personally identifiable information) to be passed by a requesting agent to an identity verification platform.

Responsive to receipt of sensitive content from a requesting agent, an identity verification platform may generate an encryption key for the interaction, for example, and a random initial value or key "salt." The identity verification platform may then encrypt sensitive content utilizing a symmetric encryption algorithm (e.g., an AES256 key) to encrypt the sensitive content. An identity verification platform may, for example, encrypt a key via an asymmetric key method (e.g., RSA or similar encryption technique).

An encrypted parameter set representing sensitive content may be passed to an identity verification platform. At times, parameters representing sensitive content may additionally include, for example, in unencrypted form, an identifier of a particular transaction (e.g., a financial transaction, etc.), and/or any other suitable content (e.g., housekeeping content, etc.). An identity verification platform may then, via an appropriate and/or applicable protocol, such as SSL, HTTPS, or the like, electronically communicate a set of sensitive content to a canonical (e.g., trusted) data source.

In an implementation, an identity verification platform may comprise, for example, a stand-alone computing device to electronically process sensitive content in a protected environment without utilizing long-term or persistent storage of sensitive. An identity verification platform may restrict access from a data source or a verifying agent other than an interface to an identity verification platform (e.g., API, etc.). In an implementation, an identity verification platform may be operated within a data center, for example, meaning that sensitive content (e.g., private consumer content, etc.) stored within the data source may be inaccessible to entities outside of the premises of the data source. Optionally or alternatively, an appliance may, for example, be installed at a particular site (e.g., third-party site, etc.), such as in response to an agreement by appropriate parties. Depending on an implementation, an appliance may not utilize nonvolatile or persistent memory to store of sensitive content. Thus, in some instances, volatile storage, exclusively, may be present in an appliance, which may assist in protecting sensitive content.

Sensitive content may be transmitted by a requesting agent to an appliance, for example, and an asymmetric key may be utilized to extract a symmetric key from a parameter set containing sensitive content. In at least one implementation, a set of encrypted parameters may, for example, be separated and/or decrypted into a volatile memory. A unique identifier may, for example, be extracted and/or passed to a data source, which may ensure that minimal sensitive content is exchanged in return for a canonical or trustworthy content from a data source.

Content returned from a data source may be stored into a memory, for example, and, in response, an identity verification platform executing a set of rules and/or comparisons against parameters supplied by a canonical data source. In response to an identity verification platform executing the set of rules, a set of verification indicators, scores, etc., that may not contain sensitive content, may be returned by the identity verification platform. Accordingly, an identifier to identify sensitive content may be attached to the returned content, for example, and a symmetric encryption key with a new random initial value may be generated to encrypt the sensitive content. Such content may be returned with an identity verification value, for example, and an identifier in plaintext with returned values encrypted.

Following generation of a response, sensitive content from a data source as well as any sensitive content from a verifying agent may be overwritten with random values. In this way, even illicit or surreptitious data accessing programs may be unable to access sensitive content stored in the memory accessible by an identity verification platform.

Responsive to an agreement between parameters supplied by a verifying agent and parameters supplied by a canonical data source, results of such comparison may be conveyed to a verifying agent. In particular embodiments, a Boolean decision to indicate whether a particular threshold was met (e.g., "verified" or "not verified"), may indicate agreement between parameters supplied by a verifying agent and parameters supplied by a canonical data source. If appropriate or applicable, one or more other suitable indicators may be included, such as, for example, a "nickname" indicator for a match like "Bob" vs "Robert" where one form may be a diminutive name for the other.

Optionally or additionally, agreement between parameters supplied by a verifying agent and parameters supplied by a canonical data source may be indicated via a trustworthiness score, which may consider more recent behavior of a communication services subscriber. A trustworthiness score may be generated to indicate whether, for example, a mobile communications device has recently been ported recently (e.g., changed carriers, etc.), or changed SIM cards, or a myriad of other events that may identify potential fraud, for example. Responsive to a determination that a mobile communications device has undergone such events may indicate a lowered level of trust in a mobile communication services subscriber.

In particular instances, an institution or organization (e.g., a financial institution) may use a trustworthiness score to determine whether to allow an interaction with a user to continue or to fail (e.g., to be denied, etc.). A particular advantage (e.g., among many) of such an approach may, for example, be that unscrupulous parties may be prohibited from accessing consumer content. In some instances, restricting access may, for example, prevent unscrupulous individuals from acquiring sensitive content, especially canonical or trustworthy content.

Thus, an identity verification platform operating within an electronic infrastructure may minimize or reduce information or content exposure. Reducing an incidence of exposure of sensitive content may be brought about by removing transfers of canonical or like content outside of a data source. An identity verification platform may advantageously appeal to an institution or organization (e.g., a bank, etc.) as well as to canonical data sources.

In some embodiments, exposure to privacy violations may be brought about by precluding access to sensitive content. In particular embodiments, an identity verification platform may not, at any time be in possession of sensitive content, which may include personally identifiable information or any other type of sensitive content. Since data sources (e.g., canonical data sources) may be incentivized to preclude release of sensitive content to external parties, other approaches or options toward securing sensitive content, such as encryption, obfuscation, or the like, may be soon obsolete. As such, identity verification platforms may represent a suitable or desirable solution for identity verification, which may include communication services subscriber identity verification, implemented in real or near real time.

Figure 2A:
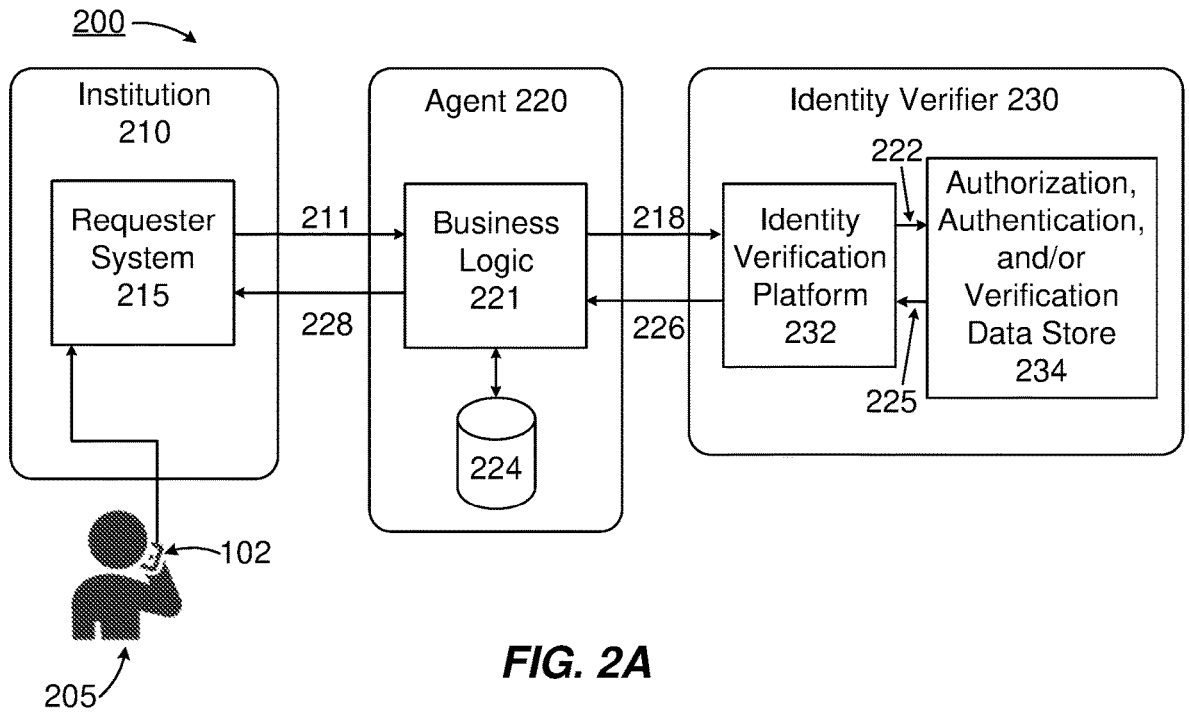
FIG. 2A is a schematic flow diagram of an implementation of an example use case or scenario for an identity verification platform, according to an embodiment.

Attention is now drawn to FIG. 2A, which is a schematic flow diagram of an implementation of an embodiment (200) of an identity verification platform. Embodiment 200 may be implemented utilizing identity verification platform 232, which may comprise a virtual or physical computing device or any combination thereof. Identity verification platform 232 may execute computer-readable instructions (e.g., software, firmware, etc.), so as to implement one or more operations and/or processes, as discussed herein. In embodiment 200, identity verification platform 232 may be deployed, such as being physically located, for example, so as to be directed by or under the control of identity verifier 230. Identity verifier 230 may represent an aspect of a mobile communication services carrier or a data store accessible to the mobile communication services carrier. In particular embodiments, identity verification platform 232 may operate as directed by (e.g., owned or leased by) an entity other than identity verifier 230. For this example, identity verification platform 232 may be owned by agent 220, who may facilitate and/or support identity verification process.

Identity verifier 230 may implement one or more identity verification processes in real-time or in near-real time. In this context, "real time" refers to an amount of timeliness of content, which may be delayed by an amount of time attributable to electronic communications involving a communications network and/or signal processing of any received signals. It should be noted that information acquired or produced, for example, by input signals, output signals, operations, results, etc., associated with embodiment 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features. For example, in some instances, embodiment 200 may be implemented, in whole or in part, within the communications infrastructure of FIG. 1.

Thus, embodiment 200 may, for example, begin with a subscriber (205) of a mobile communication services carrier interacting with mobile device 102. Mobile device 102 may communicate with institution 210, which may represent a financial institution, for example. Subscriber 205 may enter appropriate credentials, such as a username and password, such as by way of a graphical user interface operating on device 102. An applicable computing process associated with institution 210, may utilize an to obtain and process a request to interact with institution 210. Institution 210 may communicate with one or more applicable parties, such as agent 220, for purposes of initial authentication of a participating mobile device, as one example. Agent 220 may authenticate, authorize, and/or verify mobile device 102 via one or more appropriate processes, such as via linking or associating a particular subscriber account identifier to mobile device 102, for example. In embodiment 200, requester system 215 of institution 210 may also access a database, which includes, for example, a name, address, etc. of subscriber 205 associated with (or perhaps in possession of) mobile device 102. A database internal to institution 210 may include subscriber account identifiers (e.g., a mobile telephone number), and may electronically communicate the subscriber account identifier (e.g., a telephone number) to institution 210, such as together with such a name, address, etc., as referenced generally via a link at 212.

According to an implementation, responsive to receipt of sensitive content (e.g., sensitive content) from institution 210 by way of a link 211, agent 220 may employ one or more internal processes, such as referenced generally as agent's business logic 221, to authenticate, authorize, and/or verify of the identity of subscriber 205. The identity of subscriber 205, which may be implemented, at least in part, as in connection with accessing internal database 224. Database 224 may comprise, for example, any suitable content useful to validate a mobile identity of a subscriber 205 operating mobile device 102. As a way of illustration, such content is stored in internal database 224 may include, for example, mobile subscriber records and/or transaction history, such as telephone numbers, deterministic events with respect to mobile device 102 (e.g., porting or transfer events, disconnecting events, number change events, etc.). Records of deterministic events may, for example, be associated with or linked to respective aliases or unique identifiers representative of mobile identities of corresponding users (e.g., create a bind, port a subscriber account identifier from a first mobile services carrier to a second mobile services carrier, etc.). As such, when subscriber 205 participates in one or more change events, such as changes that pertain to mobile device 102, a unique identifier of that user may remain unchanged in database 224, such as due, at least in part, to tracking these changed events in relation to the unique identifier (e.g., updating subscriber records, etc.). Thus, by accessing database 224, agent 220 may determine, for example, which carrier (of a plurality of carriers) to which a participating mobile device belongs, an applicable telephony infrastructure (e.g., landline or mobile subscriber, etc.), and/or other suitable aspects useful for identity verification. Database 224 may additionally include records pertaining to recent transaction dates, porting or transfer events, etc. In some instances, agent 220 may, for example, also generate or assign a new alias or unique identifier to subscriber 205 and/or mobile device 102, if appropriate, such as responsive to a determination that subscriber 205 represents a new user (e.g., has not previously engaged in one or more transactions). If suitable or desired, agent 220 may additionally implement one or more operations, such as, for example, with respect to a physical address of subscriber 205, the name of subscriber 205, and so forth.

As illustrated via a link 218, agent 220 may, for example, electronically communicate appropriate content, such as content obtained responsive to accessing database 224, to identity verification platform 232 located at identity verifier

230. Identity verifier 230 may receive additional subscriber parameters such as an subscriber account identifier, subscriber name, and subscriber address, for example, via link 218. In particular embodiments, responsive to identity verification platform 232 being owned, leased, or otherwise under the exclusive control of (or under the direction of) identity verifier 230, identity verification platform 232 may be capable of accessing to content communicated via link 218. It should be noted that one or more electronic communications associated with embodiment 200 may be encrypted, such as via one or more appropriate techniques, as discussed above. Identity verification platform 232 may store content received via link 218 utilizing a suitable internal memory, for example, and may utilize an application program interface (API) to communicate with authorization, authentication, and/or verification data store 234 to further facilitate and/or support an identity verification process. For example, in some instances, identity verification platform 232 may provide exclusively, for example, a telephone number received from institution 210 to an API of data store 234, as illustrated via link 222. In turn, an API of data store 234 may match a provided telephone number with a particular subscriber name and/or address, such as via accessing internal carrier records, for example, and may return content (e.g., name, address, etc.) associated with the telephone number to identity verification platform 232, as illustrated via a link 222.

In an implementation, having received a response from an API of data store 234, by way of link 225, identity verification platform 232 may compare a received name and/or address with internal content stored on platform 232, for example, and may calculate one or more matching scores reflecting an outcome of such comparison. In an implementation, authorization, authentication, and/or verification of the identity of a mobile communications device subscriber may utilize one or more matching scores indicating an outcome of the comparison between a first parameter accessed from an API of data store 234 and a second parameter provided by the mobile communications device subscriber. For example, identity verification platform 232 may compute one or more scores indicating comparison results (e.g., a match or mismatch) by determining whether a name and/or address of a telephone number provided via link 222 matches a name and/or address received via links 218 and/or 212. Based, at least in part, on these or similar comparisons, identity verification platform 232 may, for example, generate one or more match indicators, initial trust scores, etc. Match indicators, initial trust scores, for example, may be generated utilizing applicable content provided via link 218 and/or by utilizing content stored (via volatile memory) in identity verification platform 232. For example, identity verification platform 232 may determine and/or generate one or more match indicators responsive to determining whether a participating mobile device is active or inactive. In such instances, a greater weight may be assigned to an active phone relative to an active phone. In some instances, a greater weight may be assigned to a subscriber account identifier that corresponds with a business account while a lesser weight may be assigned to a personal account. In some instances, whether an associated SIM card has been changed, and how many times within a given duration may negatively impact a match indicator. In some instances, whether a participating mobile device transacts on a regular basis, and occasional basis, or on an infrequent basis, or the like, may enhance or negatively impact a match indicator. Claimed subject matter is intended to embrace the above-described deterministic events as well as additional deterministic events. Additional match indicators that may be utilized to indicate how well content provided by data store 234 (e.g., via link 225, etc.) matches content provided by agent 220 (e.g., via link 218, etc.) and/or institution 210 (e.g., via link 211 etc.) may be used herein. Based, at least in part, on these or like indicators of a match/mismatch between provided content, an initial trust score reflecting one or more particular matches may, for example, be computed. For example, an initial trust score may account for any deviations from these or like matches and may reflect at least an initial level of trustworthiness (e.g., before further processing and/or analysis by agent's business logic 221, etc.) of mobile device 102.

In an implementation, as referenced via a link at 226, these or like match indicators and/or initial trust score may, for example, be electronically communicated (e.g., via an encrypted set of parameters, etc.) to agent 220, such as for further processing via business logic 221, or like process, so as to compute a trust score for reporting to institution 210, among other content. For example, business logic 221 may utilize one or more comparison results and/or initial trust scores to determine whether one or more fraud indicators exist, such as in connection with accessing content stored within database 224. As discussed above, a reported trust score may, for example, account for various historical or like aspects (e.g., via weighted factors, etc.) associated with a user of a participating mobile device, such as a duration over which a user has owned a participating mobile device (e.g., device tenure), a duration over which agent 220 has kept records relevant to a particular user, a duration over which a particular user has retained a subscriber account identifier, whether a particular user corresponds to a regular user or corresponds to a first-time customer is a regular customer or a first time customer (e.g., of institution 210, etc.), whether a subaccount of a mobile subscriber account is being used, etc. Here, any suitable approach, such as utilizing, for example, a median, a mean, a mode, a percentile of mean, a number of instances, a ratio, a rate, a frequency, an entropy, mutual information, probability, etc., or any combination thereof may be used, at least in part, or otherwise considered. Claimed subject matter is not limited to a particular approach.

In particular embodiments, a reported trust score may advantageously reflect or be representative of proof of ownership, such as ownership of a mobile device 102 by mobile subscriber 205. Additionally, a reported trust score may operate as a proof of behavior mobile subscriber 205. A reported trust score may be in any suitable form, such as comprising, for example, a binary value, a trinary value, non-binary value, or the like, or any combination thereof. In some instances, agent 220 may update an applicable record (e.g., a subscriber record in database 224, etc.), for example, based, at least in part, on match indicators and/or a trust score (e.g., initial, reported, etc.) for future use, if appropriate and/or applicable.

In an implementation, one or more match indicators (e.g., received via link 226) may be communicated to institution 210, such as in connection with a reported trust score and/or one or more applicable attributes, as illustrated via a link 228. As a way of illustration, these or like attributes may comprise, for example, whether one or more values corresponding to a particular physical address (e.g., communicated via links 211, 228) is USPS deliverable address, whether a particular physical address has been vacant and/or for what duration, whether a physical particular address corresponds a high-rise commercial building or to single family home, or the like, or any combination thereof.

In an implementation, institution 210, having received content communicated via link 228, may, for example, be capable of determining whether a mobile subscriber 205 is a trustworthy (or non-trustworthy) actor and, thus, may approve or deny a particular transaction (e.g., a financial transaction). Thus, by verifying proof of possession (e.g., authentication) and/or ownership (e.g., authorization) of a mobile device, as well as its behavior (e.g., audit), agent 220 may, for example, be capable of verifying, such as with sufficient certainty, the identity of a mobile subscriber 205. It should be noted that, in some instances, a financial transaction or other user action (e.g., verifying an account balance, etc.) may be allowed to proceed without requiring mobile subscriber 205 to enter one or more credentials (e.g., a password, etc.), just to illustrate another possible implementation. For example, access to account parameters by mobile subscriber 205 may be granted responsive to authentication of mobile device 102 by agent 220 (e.g., initially, etc.) and/or if a user is determined to be a regular customer of institution 210. Such authentication may be in response to a unique identifier or alias being tied to a mobile device 102 having been utilized to initiate a threshold number of successful transactions. In some instances, output signals communicated to institution 210 (e.g., via content communicated via link 228, etc.) may also be tailored to specific requirements of institution 210. For example, institution 210 may specify a format of a received trustworthiness score (e.g., a binary, non-binary, score granularity, etc.). In another example, institution 210 may specify indicator types of a received trustworthiness score, or may specify attributes of a received trust score, trustworthiness indicators, and so forth.

Thus, by physically locating an identity verification platform of a data center of an identity verifier (e.g., identity verifier 230), which may also be represent a computer system or network designed to block unauthorized access while permitting outward communication (e.g., a firewall), the identity verifier may be capable filtering outgoing content. Filtering may operate to ensure that sensitive content is not permitted to be under the control or direction of processing entity. For example, here, an identity verifier may be capable of confirming that no sensitive content leaves the identity verifier's control via monitoring that non-sensitive content, exclusively, (e.g., match indicators and/or initial trust score) are being communicated to an outside entity (e.g., via link 226). In addition, agent 220 may not be permitted to access identity verification platform 232 located at the data center, which may ensure that exchanges of sensitive content occur completely (or nearly completely) with an identity verifier 230. Thus an institution (e.g., institution 210, etc.) may be unable to access sensitive content, such as personally identifiable information, from an identity verifier (e.g., identity verifier 230) and vice versa. In addition, responsive to an agent (e.g., agent 220) transmitting sensitive content via links 218 and 228, leaks of sensitive content (or other sensitive information) may be eliminated or reduced, for example.

Figure 2B:
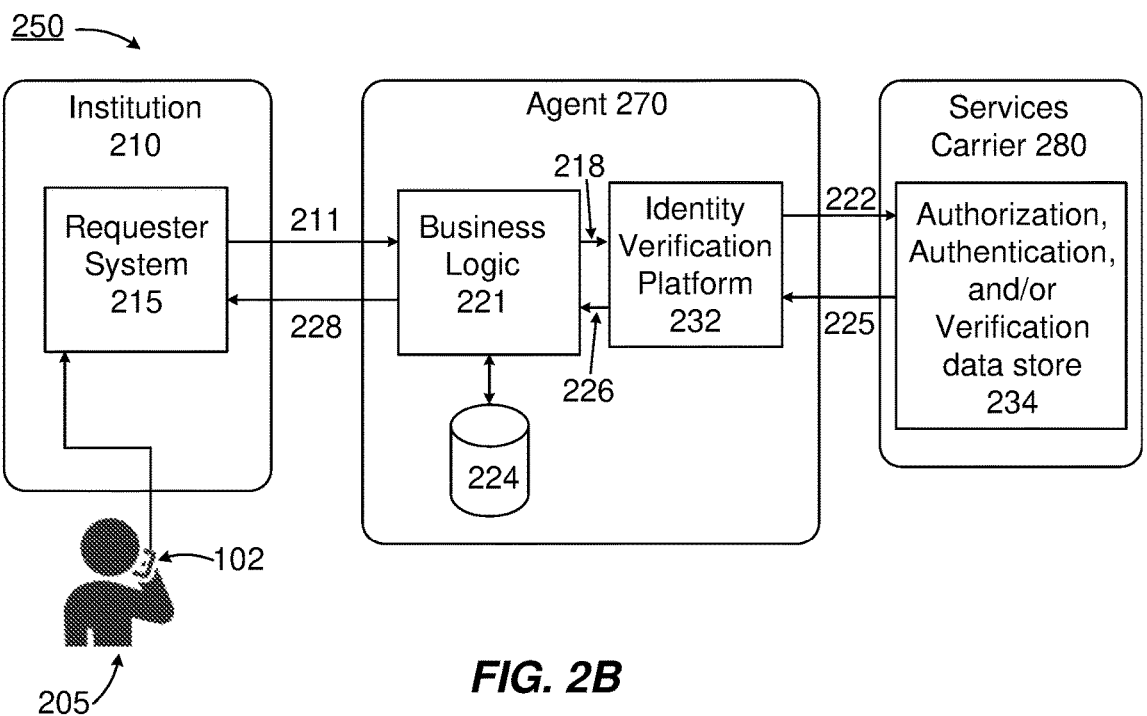
FIG. 2B is a schematic flow diagram of another implementation of an example use case or scenario for an identity verification platform, according to an embodiment.

FIG. 2B is a schematic flow diagram of another implementation of an example use case or scenario for an identity verification platform, according to an embodiment 250. In embodiment 250 may be implemented in a manner similar to example use case or embodiment 200 discussed above. However, as shown in FIG. 2B, an identity verification platform (e.g., identity verification platform 232) has been relocated (e.g., physically) to an agent, such as under the control or the direction of agent 220. Optionally, or alternatively, identity verification platform 232 may be installed at any suitable site (e.g., a third-party site, etc.), such as if agreed on by participating parties, for example. In FIG. 2B, data store 234 operates under the control of services carrier 280, which may represent any one of several communication services carriers.

In addition, an identity verification platform may be owned by an institution, so as to facilitate a paradigm in which agent 270, for example, is not permitted access to data stored within identity verification platform 232. In addition, identity verification platform 232 may operate in a manner that ensures sensitive content, for example, is kept exclusively under the control or direction of platform 232. In the embodiment of FIG. 2B, information acquired or produced, such as, for example, via input signals, output signals, operations, results, etc. associated with embodiment 250 may be represented via one or more digital signals. It may also be appreciated that even though one or more operations are illustrated or described concurrently or with respect to a certain sequence, other sequences or concurrent operations may be employed. Further, although the description below references particular aspects or features illustrated in certain other figures, one or more operations may be performed with other aspects or features. For example, in some instances, embodiment 250 may be implemented within communications infrastructure 100 of FIG. 1.

Figure 3:
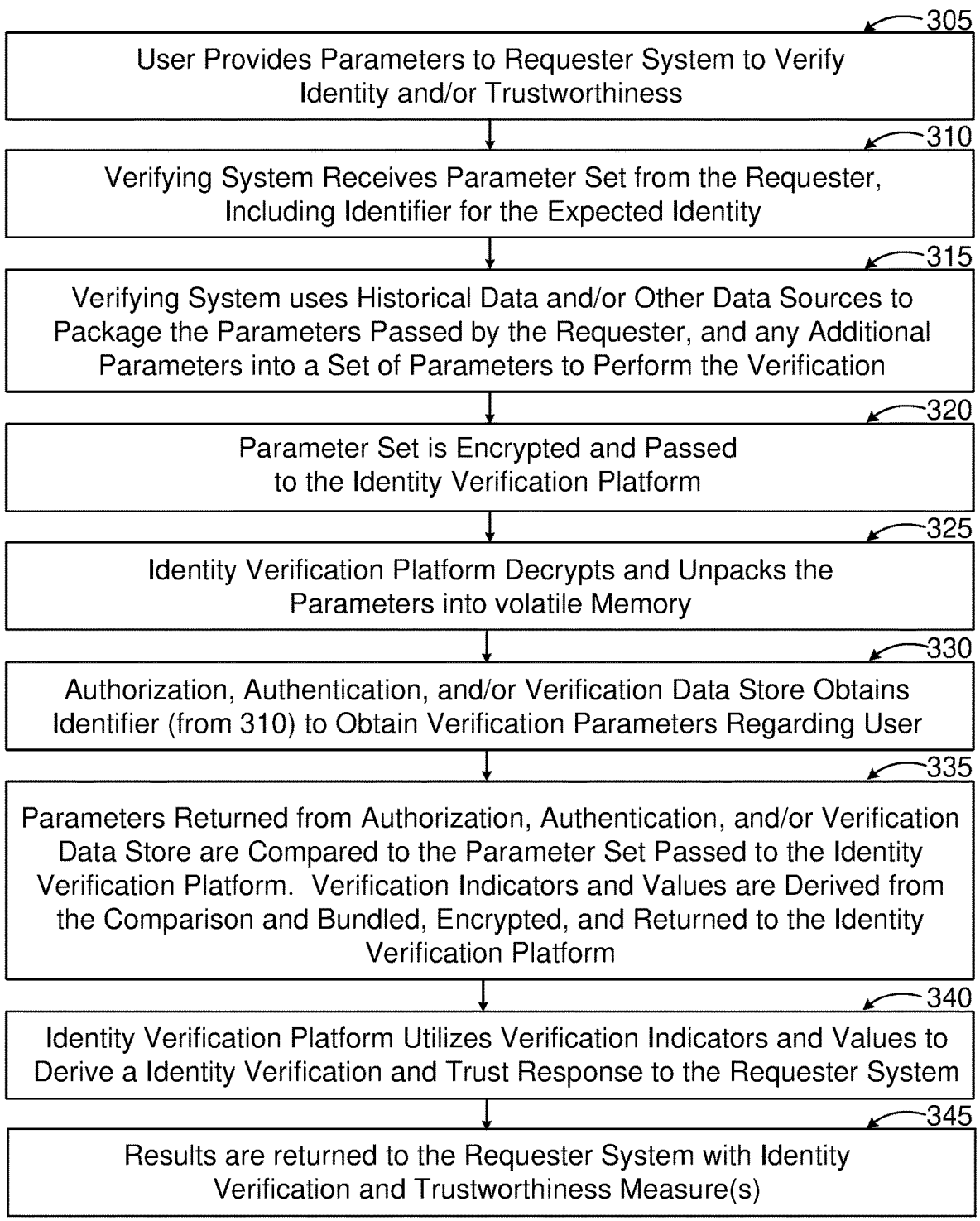
FIG. 3 is a flow diagram illustrating an implementation of an example process for an identity verification platform, according to an embodiment.

FIG. 3 is a flow diagram illustrating an implementation of an example process for an identity verification platform, according to an embodiment 300. The embodiment of FIG. 3 may be implemented, at least in part, in connection with embodiment 200 of FIG. 2A and/or embodiment 250 of FIG. 2B. Similarly, it should be noted that information acquired or produced, such as, for example, via input signals, via output signals, operations, results, etc. associated with the embodiment of FIG. 3 may be represented via one or more binary digital signals. Likewise, it should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, embodiment of FIG. 3 may, for example, begin at operation 305 with an user (e.g., mobile subscriber 205 operating mobile device 102) providing applicable parameters, such as sensitive content, to a requester system to verify identity and/or trustworthiness of the user. At operation 310, a verifying system (e.g., an agent, etc.) may, for example, receive sensitive content, such as in the form of a parameter set from a requester system, including a unique identifier for a purported identity (e.g. a phone number or other type of subscriber account identifier), just to illustrate possible implementations. At operation 315, a verifying system may, for example, use historical content or data and/or other data sources, in whole or in part, so as to package the sensitive content or the parameter set passed by requester system. At operation 315, any additional content or data, if applicable and/or appropriate, may be utilized to perform identity authentication, authorization, and/or verification. At operation 320, a parameter set may, for example, be encrypted and passed to an identity verification platform. At operation 325, an identity verification platform may decrypt and/or unpack parameters of the parameter set for storage into, for example, volatile memory. At operation 330, a canonical data source (which may correspond to authorization, authentication and/or verification data store 234 of FIGS. 2A/2B) may receive a unique identifier to obtain verification parameters concerning the user. At operation 335, parameters returned from a canonical data source may, for example, be compared to a parameter set to an identity verification platform. Here, verification indicators and/or values may, for example, be derived from such a comparison and may be encrypted and returned to a verifying system. At operation 340, a verifying system may, for example, use one or more indicators and/or values to derive an identity verification and/or trustworthiness response to a requester system. At operation 345, results may, for example, be returned to a requester system with an identity verification and/or trustworthiness indicator(s).

Figure 4:
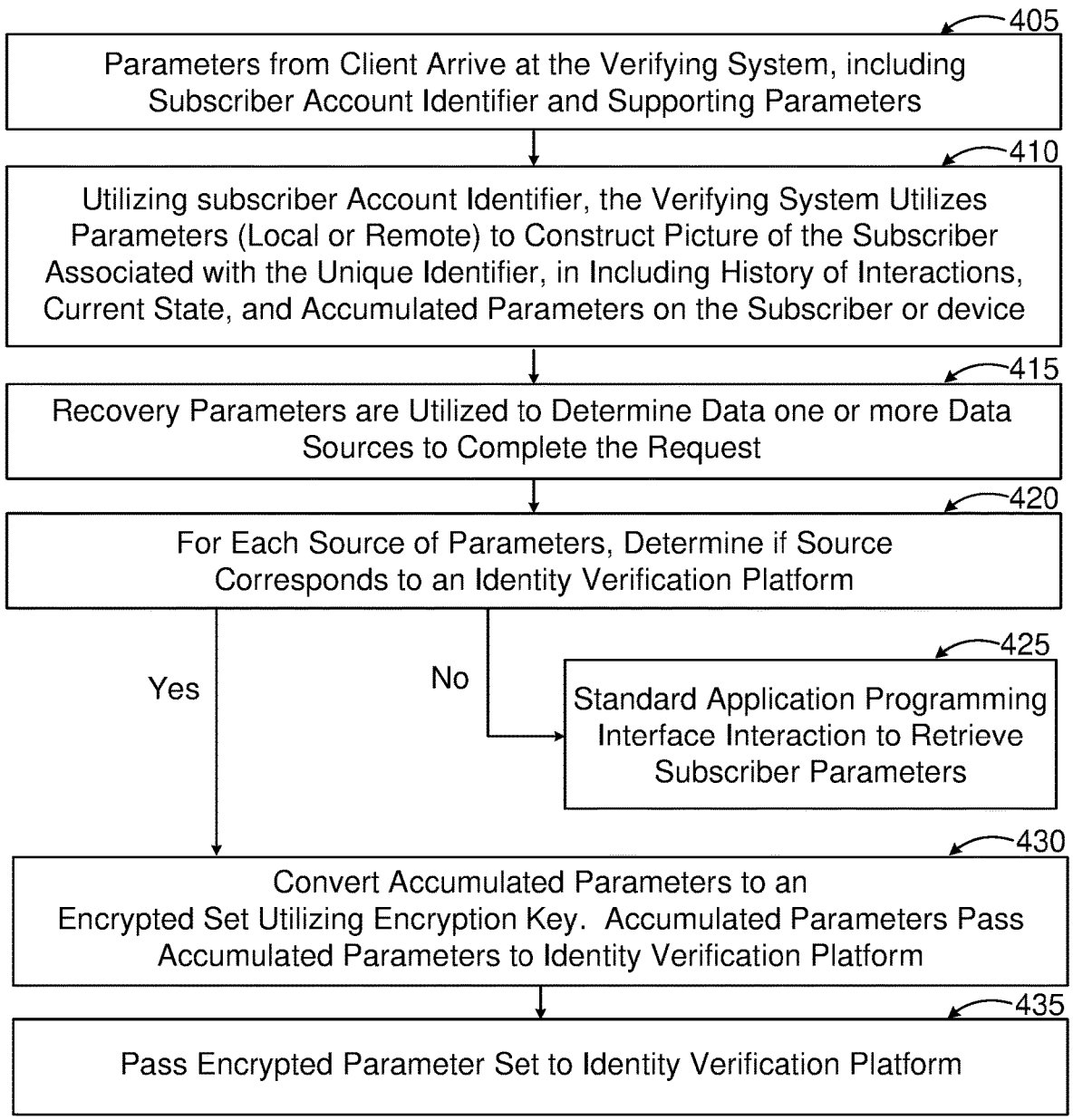
FIG. 4 is a flow diagram illustrating an implementation of an example process for packaging user-specific parameters for identity validation, according to an embodiment.

FIG. 4 is a flow diagram illustrating an implementation of an example process for packaging user-specific parameters for identity validation, according to an embodiment 400. The process of FIG. 4 may be performed in whole or in part to facilitate and/or support one or more operations and/or techniques for packaging sensitive content or a set of parameters for identity authentication, authorization, and/or verification. In some instances, the process of FIG. 4 may be implemented, at least in part, in connection with operation 315 of FIG. 3. It should be noted that information acquired or produced, such as, for example, via input signals, output signals, operations, results, etc. associated with example process of FIG. 4 may be represented via one or more binary digital signals. It may also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, embodiment of FIG. 4 may begin at operation 405, for example, with receiving or accessing a set of parameters representing sensitive content from a requester at a verifying system. A set of parameters may include a unique identifier (e.g., phone number or other type of subscriber account identifier) and/or supporting data (e.g. name, address, date of birth, etc.). At operation 410, using a unique identifier, a verifying system may, for example, utilize parameters (e.g., local or remote, etc.) to build a complete, or at least a sufficient, representation of a subscriber (e.g., mobile subscriber 205 of FIGS. 2A/2B). A sufficient representation of a subscriber may include, but is necessarily limited to, a history of interactions with a mobile device (e.g., mobile device 102), a current active/inactive state of the mobile device, historical records that pertain to the subscriber or to mobile device, etc., or any combination thereof. At operation 415, a record of historical interactions may, for example, be used, at least in part, to determine what data source(s) are to be used to complete a verification request. At operation 420, for a particular data source, it may, for example, be determined if the particular source corresponds to an identity verification platform (e.g., capable of implementing one or more identity validation processes discussed herein). If the particular data source does not correspond to an identity verification platform, the process of FIG. 4 may proceed to operation 425, such as to employ a standard API interaction to retrieve subscriber parameters, as discussed below. If, however, the particular data source corresponds to an identity verification platform, the process of FIG. 4 may, for example, proceed to operation 430, at which accumulated parameters may be converted into an encrypted parameter set, utilizing an encryption key generated for this transaction. In some instances, an encryption key may correspond to a one-time password. Accumulated data may, for example, be encrypted and/or encoded, such as to be passed (e.g., electronically communicated, etc.) to an identity verification platform. At operation 435, an encrypted set of parameters and/or a unique identifier may, for example, be passed to a an identity verification platform, and example process of FIG. 4 may proceed to operation 320, such as discussed above.

Figure 5:
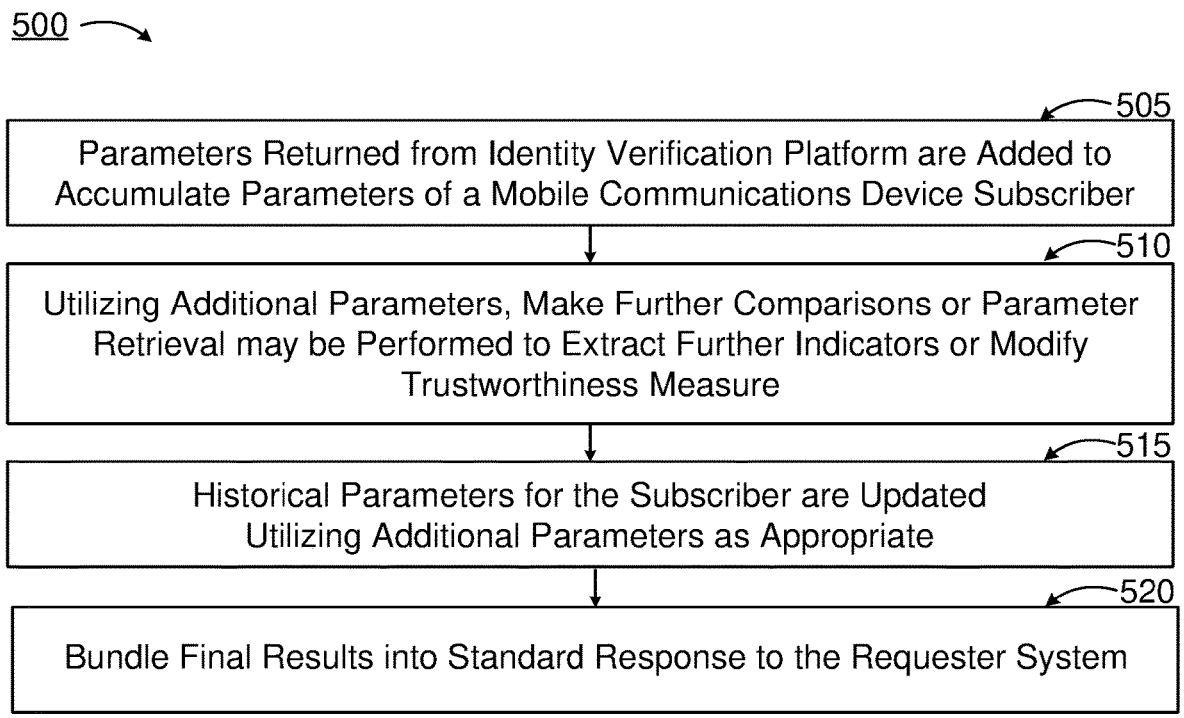
FIG. 5 is a flow diagram illustrating an implementation of an example process for evaluating and/or comparing canonical user-specific parameters, according to an embodiment.

Referring now to FIG. 5, which is a flow diagram illustrating an implementation of an example process for evaluating and/or comparing canonical user-specific parameters, according to an embodiment 500. The process of FIG. 5 may be performed, in whole or in part, to facilitate and/or support one or more operations and/or techniques for comparing canonical or trustworthy sources of sensitive content to a parameter set passed to an identity verification platform. In some instances, the process of FIG. 5 may be implemented, at least in part, in connection with operation 335 of FIG. 3. Likewise, it should be noted that information acquired or produced, such as, for example, via input signals, output signals, operations, results, etc. associated with the embodiment of FIG. 5 may be represented via one or more binary digital signals. It may also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, at operation 505, parameters returned from an identity verification platform may, for example, be added to accumulated parameters relevant to a particular subscriber (e.g., historical event-related parameters relevant to a particular subscriber, etc.). At operation 510, utilizing additional accumulated parameters relevant to a particular mobile subscriber, further comparisons or data retrieval may, for example, be implemented, so as to further extract one or more indicators, modify one or more applicable scores, etc. At operation 515, historical parameters for a subscriber (e.g., previously accumulated parameters) may be updated. At operation 520, one or more final results may, for example, be arranged into a parameter set for transmission in response to a request from a requester system.

Figure 6:
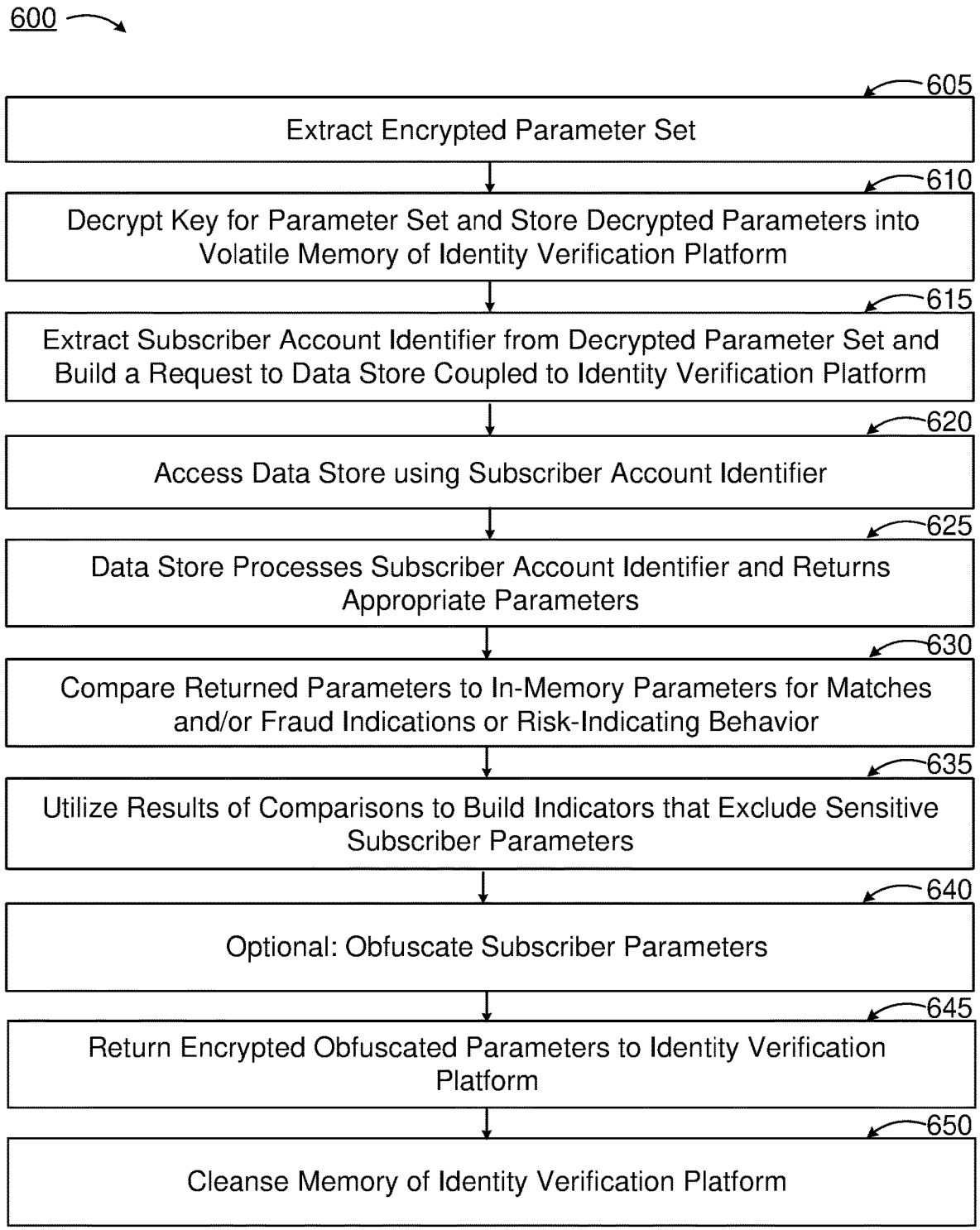
FIG. 6 is a flow diagram illustrating an implementation of an example process for decrypting and unpacking user-specific parameters, according to an embodiment.

Referring now to FIG. 6, is a flow diagram illustrating an implementation of an example process for decrypting and unpacking user-specific parameters, according to an embodiment 600. The process of FIG. 6 may be performed, in whole or in part, to facilitate and/or support one or more operations and/or techniques for decrypting and unpacking sensitive content from a memory (e.g., a volatile memory) by an identity verification platform. In some instances, the process of FIG. 6 may be implemented, at least in part, in connection with operation 320 of FIG. 3. As also illustrated, in some instances, the process of FIG. 6 may also be performed, in whole or in part, to facilitate and/or support one or more operations and/or techniques for passing a unique identifier to obtain data about an end user that, in some instances, may be implemented, at least in part, in connection with operation 305 of FIG. 3. Likewise, it should be noted that information acquired or produced, such as, for example, via input signals, output signals, operations, results, etc. associated with example process of FIG. 6 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, at operation 605, an identity verification platform may decrypt an encrypted set of parameters, which may represent sensitive content. At operation 610, utilizing an encryption key that is unique to a particular parameter set, the parameter set may be decrypted utilizing one or more approaches discussed herein. In an example, decrypted parameters may be stored in a volatile memory. In the embodiment of FIG. 6, an identity verification platform does not comprise writable, persistent storage. At operation 615, a unique subscriber account identifier (e.g., a mobile subscriber telephone number) may be extracted from parameters passed in a packet may be used to build a request to a particular canonical or trustworthy data source in communication with the identity verification platform. Operation 620 may include requesting, such as from the canonical or trustworthy data source, utilizing (e.g., exclusively) a unique identifier from a data passed in a packet. At operation 625, which, in some instances, may form a portion part of operation 305 of FIG. 3.

Subsequently, such as at operation 630, parameters returned from a canonical or trustworthy data source may, for example, be compared to applicable in-memory parameters for one or more matches, as discussed above. Alternatively, such a comparison may give rise to an indication of fraud and/or unexpected behavior. At operation 635, one or more results a comparison may, for example, be used, in whole or in part, to build or generate one or more indicators and/or values that do not reveal sensitive content. For example, a generated indicator may include values that may contain none (or little) of data of a data source (e.g. "zip code matches=true", "first name match score=80/100", etc.) or other potentially sensitive content. At operation 640, a generated indicator may be obfuscated or rendered otherwise innocuous, such as by reducing field names to suitable stand-in values. In one possible example, an a generated indicator of "zip code matches=true" may be reduced to a parameter such as "xa=1." At operation 645, obfuscated data may, for example, be returned, such as in an encrypted form, to a verifying agent, such as agent 220 of FIG. 2A. At operation 650, memory elements utilized to store decrypted values may be overwritten with random values, for example, so as to ensure that an unauthorized attempt to read memory contents does not result in compromising sensitive content. Subsequently, as illustrated, example process of FIG. 6 may proceed to operation 335, such as discussed above.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as a computing device exclusively and/or a network device exclusively, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network.

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$, 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 7:
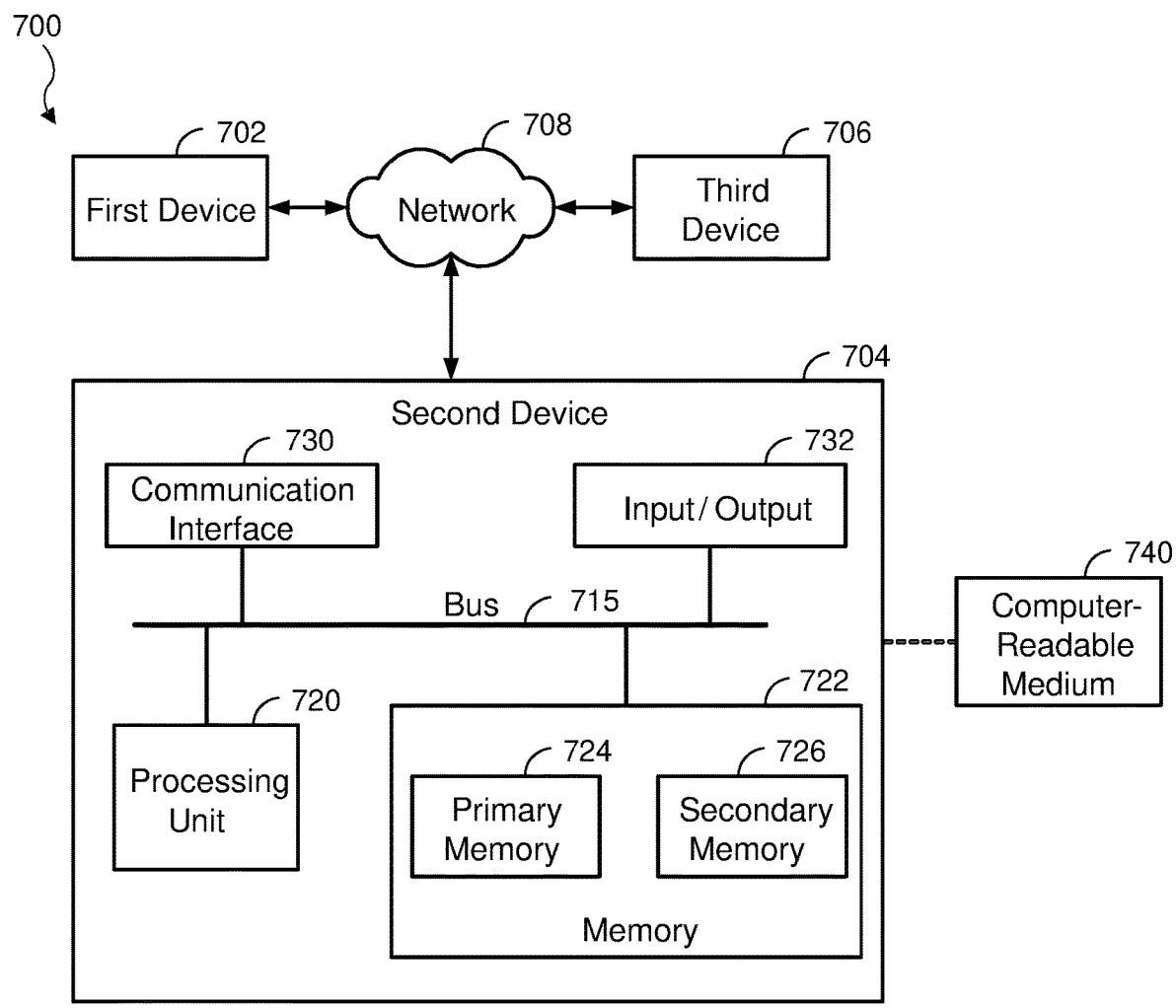
FIG. 7 is a schematic diagram illustrating an implementation of a computing device in an example computing environment, according to an embodiment.

In one example embodiment, as shown in FIG. 7, a system embodiment may comprise a local network (e.g., device 704 and medium 740) and/or another type of network, such as a computing and/or communications network. For purposes of illustration, therefore, FIG. 7 shows an embodiment 700 of a system that may be employed to implement either type or both types of networks. Network 708 may comprise one or more network connections, links, processes, services, applications, and/or resources to facilitate and/or support communications, such as an exchange of communication signals, for example, between a computing device, such as 702, and another computing device, such as 706, which may, for example, comprise one or more client computing devices and/or one or more server computing device. By way of example, but not limitation, network 708 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 7 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 7 and in the text associated with the foregoing figure of the present patent application.

Referring now to FIG. 7, in an embodiment, first and third devices 702 and 706 may be capable of rendering a graphical user interface (GUI) for a network device and/or a computing device, for example, so that a user-operator may engage in system use. Device 704 may potentially serve a similar function in this illustration. Likewise, in FIG. 7, computing device 702 ('first device' in figure) may interface with computing device 704 ('second device' in figure), which may, for example, also comprise features of a client computing device and/or a server computing device, in an embodiment. Processor (e.g., processing device) 720 and memory 722, which may comprise primary memory 724 and secondary memory 726, may communicate by way of a communication bus 715, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 704, as depicted in FIG. 7, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, an Internet service provider, a social network platform, just to provide a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 7, computing device 702 may provide one or more sources of executable computer instructions in the form physical states and/or signals (e.g., stored in memory states), for example. Computing device 702 may communicate with computing device 704 by way of a network connection, such as via network 708, for example, which may communicate with second device 704 via a communication interface 730. As previously mentioned, a connection, while physical, may not necessarily be tangible. Although computing device 704 of FIG. 7 shows various tangible, physical components, claimed subject matter is not limited to a computing devices having these tangible components exclusively as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage medium. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may be utilized to store a program of executable computer instructions. For example, processor 720 may fetch executable instructions from memory and proceed to execute the fetched instructions. Memory 722 may also comprise a memory controller for accessing device-readable medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, such as relating to one or more users, and may also comprise a computer-readable medium that may carry and/or make accessible content, including code and/or instructions, for example, executable by processor 720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 7, processor 720 may comprise one or more circuits, such as digital circuits, to perform at least a portion of a computing procedure and/or process. By way of example, but not limitation, processor 720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
    receiving, by an identity verification platform, a first set of parameters from a verifying system, wherein the first set of parameters is encrypted;
    storing, by the identity verification platform, a second set of parameters in a volatile memory, wherein the second set of parameters is a decryption of the first set of parameters;
    receiving, by the identity verification platform, a third set of parameters from a data source;
    generating, by the identity verification platform, a first identity verification based, at least in part, on a comparison of the second set of parameters and the third set of parameters;
    creating, by the identity verification platform, a second identity verification, wherein the second identity verification is an encryption of the first identity verification;
    transmitting, by the identity verification platform, the second identity verification to the verifying system, wherein:
    the second set of parameters, the third set of parameters, and the first identity verification each are sensitive content, and
    the verifying system is never exposed to any sensitive content.

2. The method of claim 1, wherein the generating the first identity verification is further based at least in part on at least one of one or more match indicators, one or more attributes, one or more trust scores, or one or more behavior indicators, or any combination thereof.

3. The method of claim 1, further comprising:
    storing, via the identity verification platform, the sensitive content in the volatile memory.

4. The method of claim 1, wherein:
    the receiving the third set of parameters from the data source comprises accessing current and/or historical records relevant to a communications device subscriber; and
    the generating the first identity verification comprises associating the communications device subscriber via an electronic identifier or alias assigned to the communications device subscriber.

5. The method of claim 1, wherein the sensitive content comprises personally identifiable information (PII) capable of identifying a communications device subscriber.

6. The method of claim 1, wherein the generating the first identity verification is implemented, at least in part, without prompting a communications device subscriber to enter one or more user credentials into a user interface of a communications device for accessing and/or using an on-line account associated with the verifying system.

7. The method of claim 1, wherein the generating the first identity verification further comprises:
    determining one or more aspects of on-line behavior of a communications device subscriber.

8. The method of claim 1, wherein the verifying system comprises a financial institution, a provider of premium content, or a healthcare organization.

9. The method of claim 1, wherein the at least one of the data source and the verifying system comprises an unauthorized party.

10. The method of claim 1, wherein the at least one of the data source and the verifying system corresponds to a telecommunication services carrier.

11. An apparatus comprising:
a processor of an identity verification platform coupled to at least one memory device of the identity verification platform to:
receive, by the identity verification platform, a first set of parameters from a verifying system, wherein the first set of parameters is encrypted;
store a second set of parameters in a volatile memory of the at least one memory device of the identity verification platform, wherein the second set of parameters is a decryption of the first set of parameters;
receive, by the identity verification platform, a third set of parameters from a data source;
generate, at least in part via the processor of the identity verification platform, a first identity verification based, at least in part, on a comparison of the second set of parameters and the third set of parameters;
create, at least in part via the processor of the identity verification platform, a second identity verification, wherein the second identity verification is an encryption of the first identity verification;
transmit, by the identity verification platform, the second identity verification to the verifying system, wherein:
the second set of parameters, the third set of parameters, and the first identity verification each are sensitive content, and
the verifying system is never exposed to any sensitive content.

12. The apparatus of claim 11, wherein the processor generate the first identity verification based at least in part on at least one of one or more match indicators, one or more attributes, one or more trust scores, or one or more behavior indicators, or any combination thereof.

13. The apparatus of claim 11, wherein the processor coupled to the at least one memory device is additionally to:
store the sensitive content in the volatile memory of the at least one memory device.

14. The apparatus of claim 11, wherein the processor coupled to the at least one memory device is additionally to:
access current and/or historical records relevant to a communications device subscriber; and
associate the communications device subscriber via an electronic identifier or alias assigned to the communications device subscriber.

15. The apparatus of claim 11, wherein the processor coupled to the at least one memory device is additionally to:
determine one or more aspects of online behavior of a communications device subscriber.

16. An article comprising:
a non-transitory storage medium having instructions stored thereon executable by a special-purpose computing platform of an identity verification platform to:
receive a first set of parameters from a verifying system, wherein the first set of parameters is encrypted;
store a second set of parameters in a volatile memory, wherein the second set of parameters is a decryption of the first set of parameters;
receive a third set of parameters from a data source;
generate a first identity verification based, at least in part, on a comparison of the second set of parameters and the third set of parameters;
create a second identity verification, wherein the second identity verification is an encryption of the first identity verification;
transmit the second identity verification to the verifying system, wherein:
the second set of parameters, the third set of parameters, and the first identity verification each are sensitive content, and
the verifying system is never exposed to any sensitive content.

17. The article of claim 16, wherein the at least one of the data source and the verifying system comprises an unauthorized party.

18. The article of claim 16, wherein the at least one of the data source and the verifying system corresponds to a telecommunication services carrier.

19. The article of claim 16, wherein the stored instructions are executable by the special purpose computing platform to generate the first identity verification based at least in part on at least one of one or more match indicators, one or more attributes, one or more trust scores, or one or more behavior indicators, or any combination thereof.

20. The article of claim 16, wherein the stored instructions are additionally executable by the special purpose computing platform to:
access current and/or historical records relevant to a communications device subscriber; and to
associate the communications device subscriber via an electronic identifier or alias assigned to the communications device subscriber.

* * * * *